(12) United States Patent
Sheerin et al.

(10) Patent No.: US 9,688,800 B2
(45) Date of Patent: Jun. 27, 2017

(54) SEQUENTIALLY POLYMERIZED HYBRID LATEX

(71) Applicant: Columbia Insurance Company, Omaha, NE (US)

(72) Inventors: Robert J. Sheerin, North Caldwell, NJ (US); Hrire Gharapetian, Ridgewood, NJ (US); Navin Tilara, Roseland, NJ (US); Kimberly Hamilton, Old Bridge, NJ (US)

(73) Assignee: Columbia Insurance Company, Omaha, NE (US)

( * ) Notice: Subject to any disclaimer, the term of this patent is extended or adjusted under 35 U.S.C. 154(b) by 57 days.

(21) Appl. No.: 14/324,826

(22) Filed: Jul. 7, 2014

(65) Prior Publication Data
US 2016/0002456 A1 Jan. 7, 2016

(51) Int. Cl.
| | |
|---|---|
| *C08F 2/22* | (2006.01) |
| *C08F 220/56* | (2006.01) |
| *C08F 220/18* | (2006.01) |
| *C08F 265/10* | (2006.01) |
| *C08F 265/00* | (2006.01) |
| *C08F 265/06* | (2006.01) |
| *C09D 151/00* | (2006.01) |
| *C08F 222/38* | (2006.01) |

(52) U.S. Cl.
CPC ............. *C08F 265/00* (2013.01); *C08F 2/22* (2013.01); *C08F 265/06* (2013.01); *C09D 151/003* (2013.01); *C08F 222/385* (2013.01)

(58) Field of Classification Search
CPC ............ C09D 5/02; C08L 31/04; C08L 33/02
See application file for complete search history.

(56) References Cited

U.S. PATENT DOCUMENTS

| | | | |
|---|---|---|---|
| 4,683,269 A | 7/1987 | Aksman | |
| 4,876,313 A | 10/1989 | Lorah | |
| 4,916,171 A | 4/1990 | Brown et al. | |
| 5,041,464 A | 8/1991 | Hoshino et al. | |
| 5,081,166 A * | 1/1992 | Kiehlbauch | C08F 265/06 428/137 |
| 5,212,251 A | 5/1993 | Lorah et al. | |
| 5,356,956 A | 10/1994 | Uemae et al. | |
| 5,399,621 A | 3/1995 | Kohlhammer | |
| 5,403,894 A | 4/1995 | Tsai et al. | |
| 6,337,131 B1 | 1/2002 | Rupaner et al. | |
| 6,646,058 B1 | 11/2003 | Koger | |
| 6,723,779 B2 | 4/2004 | Drujon et al. | |
| 7,589,158 B2 | 9/2009 | Yang et al. | |
| 7,947,760 B2 * | 5/2011 | Janmaat | C08F 257/02 523/160 |
| 8,034,871 B2 | 10/2011 | Bochnik et al. | |
| 8,530,591 B2 | 9/2013 | Yang et al. | |
| 8,580,873 B2 | 11/2013 | Hyman et al. | |
| 2007/0218291 A1 * | 9/2007 | Chiou | C08G 18/73 428/411.1 |
| 2008/0058473 A1 * | 3/2008 | Freidzon | C08F 2/22 525/191 |
| 2009/0227705 A1 | 9/2009 | Bochnik et al. | |
| 2012/0165428 A1 | 6/2012 | Tilara et al. | |
| 2014/0039122 A1 * | 2/2014 | Mestach | C08F 2/26 524/745 |
| 2014/0235752 A1 | 8/2014 | Gharapetian et al. | |
| 2014/0323635 A1 * | 10/2014 | Yang | C08K 5/20 524/457 |

FOREIGN PATENT DOCUMENTS

CA 2118754 A1 9/1994

OTHER PUBLICATIONS

Mohammad Reza Moghbeli et al. "Poly(n-butyl acrylate)/Poly(vinyl acetate-co-methyl methacrylate) Structural Rubber Latex Particles as Impact Modifier for Unsaturated Polyester Resin: Preparation and Characterization." Iranian Polymer Journal. vol. 20 No. 7. 2011.

Petruta Dumitru et al. "The Impact of Rheology Modifiers on the Viscosity of Decorative Water Based Paint Upon Tinting." U.P.B. Sci. Bull., Series B. vol. 73, Iss. 1, 2011.

Marina Damiao Besteti et al. "Production of Core-shell Particles by Combined Semibatch Emulsion/Suspension Polymerizations." Wiley-VCH Verlag GmbH & Co. KGaA. 2011.

Martha Sanmiguel et al. "Pressure-Sensitive Adhesives Based on Nanostructured Latex Particles." International Journal of Polymeric Materials. 2006.

* cited by examiner

*Primary Examiner* — Vu A Nguyen
(74) *Attorney, Agent, or Firm* — The H.T. Than Law Group

(57) ABSTRACT

The present invention relates to a hybrid latex composition containing polymer particles that are polymerized in at least two stages including a first phase acrylic core polymer, and a second phase vinyl acrylic shell polymer including a monomer that is crosslinkable under ambient conditions. Paint compositions and architectural coatings containing the latex composition according to the invention are also described herein, as well as methods for making the same.

23 Claims, No Drawings

US 9,688,800 B2

SEQUENTIALLY POLYMERIZED HYBRID LATEX

FIELD OF THE INVENTION

The present invention relates to a hybrid latex composition containing polymer particles that are polymerized in at least two sequential stages including a core copolymer of acrylic monomers of a first phase, and a shell copolymer of acrylic and vinyl acetate monomers of a second phase, including a monomer that is crosslinkable under ambient conditions. The emulsion coating composition according to the invention can advantageously be used in paint compositions and architectural coating applications.

BACKGROUND OF THE INVENTION

Latex made up of all acrylic polymers are known for their toughness, good water resistance, and excellent scrub and stain resistance when used as binders in paints. On the other hand, vinyl acrylic latex polymers (e.g. a copolymer of vinyl acetate and acrylic monomer) have the unique property of longer open time and ease of application due to its hydrophilic nature, which allows water to remain in the film longer. However, polymer resins made with vinyl acetate are more prone to water sensitivity. Vinyl acetate monomers are also more economical than their acrylic counterparts. Alone, acrylic and vinyl acetate latexes have desirable properties; however, blending of an all-acrylic polymer and a vinyl acrylic polymer may compromise the overall performance of the latex, and compatibility issues of the two different polymers may arise.

Core-shell copolymer has found relevance in a variety of applications including adhesives, binder, inks, paints and architectural coatings. Generally, core-shell copolymers are prepared by a stepwise emulsion polymerization, a first step produces a core polymer or a first phase and a second step produces a shell polymer or a second phase. The shell polymer contributes to the film property and the core polymer imparts the mechanical strength to the latex.

However, there remains a need for an improved polymer that has the properties of good durability, long open time, good flow and leveling, easy application, and good water sensitivity, and can be made with cost effective starting materials.

BRIEF SUMMARY OF THE INVENTION

The present inventors have determined that core and shell of different polymer units in latex particles allow combination of properties that are not readily achievable with blends of the different single polymer units. The present invention provides an aqueous crosslinkable core-shell latex composition that includes an all-acrylic polymer core and a vinyl acrylic polymer shell with ambient crosslinkable monomers polymerized thereon. The inventive core-shell hybrid latex is prepared by a sequential polymerization process. The crosslinkable monomers solve the latex hydrophilicity caused by vinyl acetate monomer, improve the shell's toughness, and provide good block resistance property to the film. The resulting hybrid polymer possesses the beneficial performance properties of an individual all-acrylic polymer and vinyl acrylic polymer and is made in a cost effective manner.

The present invention is directed to a latex aqueous composition comprising sequentially polymerized latex particles having a first phase polymer, and a second phase polymer. The first phase polymer is polymerized from a first set of monomers comprising acrylic monomers, and the second phase polymer is polymerized from a second set of monomers comprising acrylic monomers, vinyl monomers and about 0.5 to about 2-6 wt. % of a crosslinkable monomer. The second phase polymer comprises between about 50% to about 90% of the total weight of the polymer. The crosslinkable monomers are selected from the group consisting of diacetone acrylamide, diacetone methacrylamide and acetoacetoxyethyl methacrylate or the like or a combination thereof, and the latex aqueous composition further comprises a cross-linking agent in the aqueous phase to crosslink with the crosslinkable monomer when water evaporates.

The first set of monomers further may comprise about 0.5 wt. % to about 2-6 wt. % of the crosslinkable monomer. The cross-linking agent in the latex aqueous composition may include adipic dihydrazide. The vinyl monomers may comprise vinyl acetate, and the acrylic monomers may comprise butyl acrylate or 2-hexyl ethyl acetate. The first set of monomers may comprise a crosslinking monomer, which can be 1,4-butanediol diacrylate.

The second phase polymer comprises between about 60% to about 80% of the total weight of the latex particles. The ratio of vinyl monomer to acrylic monomer in the sequentially polymerized latex particles ranges from about 60:40 to about 95:5, preferably from about 60:40 to about 90:10, or from about 70:30 to about 90:10, or from about 60:40 to about 80:20. The latex particles may have a minimum film forming temperature from about 4° C. to about 15° C., and a volume average particle size of the sequentially polymerized latex particles ranges from about 120 nm to about 165 nm in diameter.

The first phase polymer may form the core or the shell of core-shell latex particles. Alternatively, the first phase polymer and the second phase polymer may form side-by-side latex particles.

According to another embodiment of the present invention, a paint composition is provided that has the core-shell latex aqueous composition of any of the embodiments summarized above.

DETAILED DESCRIPTION OF THE INVENTION

The present invention concerns an aqueous latex composition comprising copolymers of acrylic and vinyl acetate and the method of making the same. Commonly owned issued U.S. Pat. No. 8,034,871 and published as US 2009/0227705 A1 entitled "Latex Based Open-Time Extender for Low VOC Paints" to Bochnik et al. discloses a sequentially polymerized core-shell latex open-time extender, which is added to the paint composition or architectural coating. U.S. publication No. 2012/0165428 entitled "Polymer for Extending the Open Time of Waterborne Architectural Coating" to Tilara et al. teaches another water soluble open time extender to be mixed with the paint composition/architectural coating. Both Bochnik and Tilara are incorporated herein by reference in their entireties. Both Bochnik and Tilara teach an additive, i.e., open time extenders, in an aqueous solution, to be added to a paint composition. The present invention is directed to a novel film forming hybrid latex that is cross-linkable to each other in ambient conditions.

One aspect of the present invention relates to a hybrid latex containing polymer particles that are polymerized in at least two stages so as to form two distinct phases. The first phase is typically a bulk or core polymer, which preferably is an all acrylic core cross-linked during polymerization. The second phase is a surface or shell polymer, which preferably is a vinyl-acrylic copolymer with a cross-linkable moiety polymerized thereon. The cross-linkable moieties cross-link with other latex particles in ambient conditions preferable with a cross-linking agent in water.

A conventional acrylic latex polymerization typically involves a single charge of emulsified monomer or a monomer mix that is introduced, initiated, and polymerized to form polymer particles. However, a two-stage sequential latex polymerization according to the invention can involve the following: a first introduction, initiation, and polymerization of a first charge of monomer to form the first phase; and, thereafter, introduction of a second charge of monomer or monomer emulsion and co-polymerization of that second charge of monomers with the first phase to form a second phase. Multi-stage sequential latex polymerizations according to the invention advantageously allow for the second phase to be introduced within 0 min to 240 min, preferably between 60 and 120 min, more preferably 90 min, of the completion of the first core phase.

A two-stage sequential latex polymerization according to the invention can occur in the following manner. First, an initial kettle charge containing water, optionally but preferably a surfactant, and optionally a buffer like sodium bicarbonate, is placed in a reaction vessel (i.e. reactor) and brought to a polymerization temperature with nitrogen purge. The polymerization temperature can be tailored to the particular initiators/monomers in the polymerization. For example, when sodium persulfate is used as the initiator for acrylic monomers, the polymerization temperature can be between about 70° C. and about 90° C., preferably between about 75° C. and about 85° C., and more specifically about 80° C. When the initial kettle charge and the reaction vessel are at temperature, a seed amount of a first emulsion containing water, a surfactant, a first mixture of monomers, additional additives, and optionally a pH adjustor can then be added. A first initiator solution containing water and persulfate initiator can thereafter be added to the emulsion. A seed amount of monomer, in combination with the initiator solution, should be sufficient to allow the polymerization to begin. In one embodiment, the seed amount can represent about 1% to about 10%, for example from about 3% to about 6%, of the weight of the first emulsion. The proportion of monomers added in this first emulsion can ideally represent the desired composition of the first phase.

Typically, a short period of time such as about 15 minutes is allowed for the initiator solution and the monomer emulsion to reach the polymerization temperature and for the polymerization to begin. Thereafter, the remainder of the first emulsion can be added to the reaction vessel, either continuously or in multiple sequential charges, along with a second initiator solution containing water and sodium persulfate. The first emulsion can advantageously contain at least about 10 wt. %, preferably at least about 25 wt. %, more preferably at least about 40 wt. % or at least about 50% of the total monomer content. The first emulsion can also advantageously contain no more than about 90 wt. %, preferably no more than about 80 wt. %, more preferably no more than about 70 wt. % of the total monomer content.

When all of the first emulsion has been added, a second emulsion is simultaneously added with the second initiator solution. The second emulsion contains water, a surfactant, a second mixture of monomers, additional additives, and optionally a pH adjustor. The rates of addition of the first and second emulsions and the second initiator solution containing water and sodium persulfate can advantageously be tailored to be appropriate to the reaction conditions and the nature of the reactants in the polymerization. Nevertheless, the rate of addition of the second initiator solution should typically be such that the second initiator solution is co-added during both the addition of the remainder of the first emulsion and the addition of the second emulsion.

In one embodiment, the sequential addition of the monomer emulsions can occur for a period of about 2 to about 5 hours, preferably from about 3 to about 4 hours, for example about 3.5 hours. After the additions of monomer and initiator have ended, a sufficient polymerization time is allowed. This polymerization time can be, in one embodiment, from about ½ hour to about 2 hours, for example about 1 hour.

The inventive latex is sequentially polymerized in at least two stages so as to form at least two distinct phases: the first phase may be a core and the second phase may be a shell, whereby the core is the result of the first phase of the sequential emulsion polymerization, and the shell is the result of the second phase of the sequential emulsion polymerization. The relative positions of the first and second phases of the polymer particles can be internal and external, e.g., core and shell, as well as neighboring, e.g., side-by-side, dependent on how the first and second phases of the polymerization are performed. Preferably, the relative positions of the first and the second phases of the polymer particles are internal and external. As used herein, the terms core and shell also include the side-by-side configuration.

After the polymerization has run its course, optionally but preferably, a two part chaser system can be co-added to the reaction vessel. The first part of the chaser system is a solution containing water, a redox initiator system comprising an oxidizing agent (e.g. tert-butyl hydroperoxide), and optionally a surfactant. The second part is comprised of water, a reducing agent (e.g. a sodium salt of an organic sulfinic acid derivative), and optionally a surfactant. The primary purpose of the chaser solution, when present, is to react with, and thus devolatilize, any residual monomers and/or low molecular weight oligomers from the polymerization. Following the optional addition of the chaser solution, a stabilizing solution containing water and a pH adjustor, as well as a biocide/preservative can optionally be added to the reaction vessel to help stabilize the latex emulsion.

The core may be polymerized with crosslinking monomers, e.g., 1,4-butanediol diacrylate, in the pre-emulsion composition. Alternatively, crosslinkable monomers such as diacetone acrylamide (DAAM) are present and are co-polymerized in the first stage pre-emulsion composition. The crosslinking monomers cross-link the core during the polymerization process. On the other hand, the crosslinkable monomers remain un-crosslinked while in the aqueous phase and become cross-linked after being applied to a surface and the water evaporates. The crosslinked monomer of the core polymer imparts improved hardness and weathering property to the resulting latex. The shell should have the crosslinkable monomers co-polymerized thereon. After being applied on to a substrate, the crosslinkable monomers in the shell crosslink to other latex particles to form a film. The core may also have cross-linkable monomers polymerized thereon.

In one embodiment, a paint composition containing core-shell hybrid latex particles according to the invention can be formulated according to the following method. First, a pigment dispersion composition, or grind, is formed by: combining water, a dispersant, a pH adjustor, surfactant, defoamer, colorant/pigment, optionally a plasticizer, and a biocide/preservative; stirring and optionally grinding for a period of time to sufficiently mix the ingredients; and, while continuing to stir and/or grind, adding more water. To this pigment dispersion composition can be added a latex containing sequentially polymerized polymer particle according to the invention, followed by a pH adjustor, if desired, and a performance additive composition comprising an organic solvent, a surfactant, and a defoamer. Optionally but preferably, an anticorrosive solution can then be added. Then, a rheology modifier can be added, optionally including more water, if desired, and also a pH adjustor, thus forming a paint composition. Furthermore, if desired, more colorant(s) and/or pigment(s) can be added to the paint composition either to compliment the (white) pigment(s)/colorant(s) already in the pigment dispersion composition or to add another desired color to the paint composition.

As used herein, the term "acrylic" refers to (co)polymer compositions made from monomers selected from the group consisting of acrylates, alkacrylates, alkyl acrylates such as butyl acrylate, alkyl alkacrylates, acrylic acid, ionic acrylate salts, alkacrylic acids, ionic alkacrylate salts, acrylamide, alkacrylamides, monoalkyl acrylamides, monoalkyl alkacrylamides, acrylonitrile, alkacrylonitriles, substituted versions thereof (e.g., hydroxyalkyl acrylates, hydroxyalkyl alkacrylates, alkacrylamidoalkyl ethyleneureas, alkenyloxyamidoalkyl ethyleneureas, and the like), 2-ethylhexyl acrylate (2-EHA) and the like, and combinations thereof.

Vinyl monomers include vinyl esters, such as, for example, vinyl acetate, vinyl propionate, vinyl laurate, vinyl pivalate, vinyl nonanoate, vinyl decanoate, vinyl neodecanoate, vinyl butyrates, vinyl benzoates, vinyl isopropyl acetates and similar vinyl esters; vinyl aromatic hydrocarbons, such as, for example, styrenic monomers listed below, vinyl aliphatic hydrocarbon monomers, such as, for example, vinyl chloride and vinylidene chloride as well as □□olefins such as, for example, ethylene, propylene, isobutylene, as well as conjugated dienes such as 1,3-butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

In one embodiment, the latex composition according to the invention can be used in architectural coatings and in paint formulations. In another embodiment, the latex composition according to the invention can be combined with one or more pigments/colorants in hydrophobic latex applications.

The inventive core-shell latex aqueous composition comprises sequentially polymerized polymer latex particles having a core and a shell, wherein the core polymer is polymerized from a first set of acrylic monomers, including about 1% to about 5% by weight or about 1% to about 4% by weight of a crosslinking monomer or a first crosslinkable monomer; and the shell polymer is polymerized from a second set of acrylic and vinyl/vinyl acetate monomers including about 1% to about 5% by weight or about 1% to about 4% by weight of a second crosslinkable monomer thereof. The shell preferably contains about 65% to about 75% of all the weight of the core-shell latex, and can be in the range of about 50% to about 95% and more preferably about 60% to about 80% of the weight of the latex. The core would make up the remaining weight. The shell preferably is a co-polymer of vinyl monomers, acrylic monomers and the crosslinkable monomers. Independent of the crosslinkable monomer, the ratio of the vinyl monomer to acrylic monomer in the sequentially polymerized latex particles is from about 60:40 to about 95:5 and can be about 70:30, 80:20, or 90:10 or any ranges or subranges within these ratios. For example, the range of vinyl to acrylic ratios in the sequentially polymerized latex particles could be 60:40-90:10 or 70:30-95:5 and so on. The total vinyl amount in the latex could be greater than about 50%, about 60%, or about 70%. The cross-linking monomers in the core, which can be polymerized as part of the core, can be 1, 4 butanediol diacrylate. The first and second crosslinkable monomers, which are also polymerized as part of the core, if present, and shell, respectively, are selected from the group consisting of diacetone acrylamide (DAAM), diacetone methacrylamide (DAMAM) and acetoacetoxyethyl methacrylate (AAEM) or the like or a combination thereof. The aqueous composition that suspends the core-shell latex preferably comprises 0.5-2.5 wt. % of a cross-linking agent, such as adipic dihydrazide relative to the amount of crosslinkable monomers. The cross-linking agent in the aqueous composition typically is not polymerized as a moiety on the core-shell latex. The ratio of the crosslinkable monomer in the shell to the crosslinking agent in the aqueous composition is about 2:1.

The core-shell latex of this invention shows both the unique durability of an all-acrylic polymer and the properties of an open time extender of a vinyl polymer. The crosslinkable monomer polymerized into the shell is present at a sufficient amount to counteract the hydrophilic nature of the vinyl by providing good blocking property, low water sensitivity, and exceptional durability.

EXAMPLES

The following Examples are merely illustrative of certain embodiments of the invention and contain comparisons of compositions and methods according to the invention with embodiments outside the present invention. The following Examples do not limit the scope and breadth of the present invention, as recited in the appended claims.

Examples 1-39, 42 and 43, as compiled in Table I, relate to core-shell latexes that are polymers of vinyl acrylic and all-acrylic copolymers. The vinyl acrylic copolymers are copolymers of vinyl acetate and butyl acrylate monomers or 2-EHA, and the all-acrylic copolymer have methyl methacrylate and butyl acrylate monomers. The vinyl acetate and butyl acrylate or 2-EHA monomers in the vinyl acrylic copolymer may have a preferred weight ratio of about 80:20 or about 4:1; however, their ratios can have the ranges discussed above or can be any ranges or sub-ranges shown in the Examples below. On the other hand, the methyl methacrylate and butyl acrylate monomers in the all acrylic polymer may have a weight ratio of about 1.1:1. The minimum film forming temperature (MFFT) for these core-shell latexes ranges from 4-15° C., or any ranges or sub-ranges shown in the Examples below.

Examples 1-3 and 42-43 relate to latexes that have a core of vinyl acrylic copolymer and a shell of an all-acrylic copolymer. The weight ratios of core to shell in these latexes range from 50:50 to 70:30.

Examples 4-39 relate to latexes that have a core of an all-acrylic copolymer and a shell of a vinyl acrylic copolymer. The weight ratios of core to shell in these latexs range from 10:90 to 80:20.

Comparative Examples 40-41 represent single phase latexes polymerized from monomers of vinyl acetate and butyl acrylate in two different weight ratios of 4:1 and 8.4:1 respectively. The latex of Example 41 is more heavily weighted towards vinyl acetate and has a correspondingly higher MFFT of 10° C. compared with 6° C. of Example 41.

In the cases of Examples 1, 3 and 39, the remaining Stage II pre-emulsion solution was all added to the reactor along with a post addition of polyoxyethylene tridecyl ether phosphate, ammonium salt, (30 g) after 3.5 hours to stabilize the latex. Examples 32 and 38 comprise no DAAM, and serve as control examples. The range of DAAM within the present invention can be between any two values in the core and/or shell in the examples and can be as low as 0.5% and as high as the total % in both the core and the shell.

TABLE I

Hybrid Latex Particle Examples

| Particle | Example | Core/Shell wt. ratio | Core | | Shell | | MFFT °C. | NV % | PS (nm) core | PS (nm) shell | % DAAM core | % DAAM shell |
|---|---|---|---|---|---|---|---|---|---|---|---|---|
| VA/BA core Acrylic shell | 1 | 50/50 | VA/BA | 3.98/1 | MMA/BA | 1.13/1 | 11 | 50.8 | 113 | 154 | 4 | 4 |
| | 2 | 60/40 | | 4.00/1 | | 1.13/1 | 11 | 51.4 | 119 | 146 | 4 | 4 |
| | 3 | 70/30 | | 4.01/1 | | 1.13/1 | 11 | 50.7 | 135 | 152 | 4 | 4 |
| | 42 | 70/30 | | 4.00/1[A] | | 1.13/1 | — | 50.2 | 192 | 225 | 2 | 4 |
| | 43 | 70/30 | | 4.00/1[A] | | 1.13/1 | 9 | 49.9 | 182 | 229 | 0 | 6 |
| Acrylic core-Vinyl Acrilic shell | 4 | 80/20 | MMA/BA | 1.13/1 | VA/BA | 3.98/1 | 14.6 | 50.5 | — | 138 | 4 | 4 |
| | 5 | 50/50 | | 1.13/1 | | 3.98/1 | 11 | 50.9 | — | 121 | 4 | 4 |
| | 6 | 50/50 | | 1.13/1 | | 3.98/1 | 11 | 52 | — | 126 | 4 | 4 |
| | 7 | 30/70 | | 1.13/1 | | 4.01/1 | 10 | 51.0 | — | 136 | 4 | 4 |
| | 8 | 80/20 | | 1.13/1 | | 3.81/1 | 13.7 | 51.2 | | 133 | 4 | 4 |
| | 9 | 10/90 | | 1.13/1 | | 4.00/1 | 4 | 50.7 | — | 124 | 4 | 4 |
| | 10 | 50/50 | | 1.13/1 | | 3.99/1 | 11 | 51.3 | — | 121 | 4 | 4 |
| | 11 | 50/50 | | 1.13/1 | | 3.99/1 | 11 | 50.8 | — | 128 | 4 | 4 |
| | 12 | 30/70 | | 1.13/1 | | 4.00/1 | 8.5 | 51.2 | 96.50 | 146.4 | 4 | 4 |
| | 13 | 30/70 | | 1.13/1 | | 4.00/1 | 9.5 | 51.4 | 91.80 | 155.3 | 4 | 4 |
| | 14 | 30/70 | | 1.13/1 | | 4.00/1 | 9.0 | 50.9 | 91.30 | 159.3 | 4 | 4 |
| | 15 | 30/70 | | 1.13/1 | | 4.00/1 | 9.0 | 51.02 | 94.30 | 165.1 | 4 | 4 |
| | 16 | 30/70 | | 1.13/1 | | 4.00/1 | 9.0 | 50.72 | 93.40 | — | 0 | 4 |
| | 17 | 30/70 | | 1.13/1 | | 8.09/1 | 10.8 | 51.03 | 95.80 | 150.8 | 3 | 3 |
| | 18 | 30/70 | | 1.13/1 | | 19.00/1 | 10.0 | 51.08 | 94.40 | — | 3 | 3 |
| | 19 | 30/70 | | 1.13/1 | | 8.09/1[A] | 10.75 | 50.71 | 93.50 | 145.0 | 3 | 3 |
| | 20 | 30/70 | | 1.13/1 | | 4.00/1[A] | 8.5 | 50.42 | 93.57 | 147.5 | 4 | 4 |
| | 21 | 30/70 | | 1.13/1 | | 4.00/1 | 9.5 | 50.96 | 91.40 | 151.9 | 4 | 4 |
| | 22 | 30/70 | | 1.13/1 | | 4.00/1 | — | — | — | — | 4 | 4 |
| | 23 | 30/70 | | 1.13/1 | | 4.00/1 | — | — | — | — | 4 | 4 |
| | 24 | 30/70 | | 1.13/1 | | 3.98/1 | 6.6 | 50.64 | 96.0 | 146.8 | 4 | 4 |
| | 25 | 30/70 | | 1.13/1 | | 3.98/1 | 8.5 | 50.42 | 93.57 | 147.5 | 4 | 4 |
| | 26 | 30/70 | | 1.13/1 | | 3.98/1 | 9.5 | 50.96 | 91.4 | 151.9 | 4 | 4 |
| | 27 | 30/70 | | 1.13/1 | | 3.98/1 | 10.7 | 49.86 | 93.7 | 143.8 | 4 | 4 |
| | 28 | 30/70 | | 1.13/1 | | 3.98/1 | 9.0 | 50.5 | 95.2 | 151.2 | 4 | 4 |
| | 29 | 30/70 | | 1.13/1 | | 3.98/1 | 9.5 | 50.17 | — | 160.2 | 4 | 4 |
| | 30 | 30/70 | | 1.13/1 | | 3.98/1 | 8.0 | 50.51 | 96.2 | 148.6 | 4 | 4 |
| | 31 | 30/70 | | 1.13/1 | | 3.98/1 | 9.0 | 50.94 | 92.8 | 142.2 | 4 | 4 |
| | 32 | 30/70 | | 1.13/1 | | 3.98/1 | 11 | 50.10 | 89.7 | 137.6 | 0 | 0 |
| | 33 | 30/70 | | 1.13.1 | | 3.98/1 | 10.5 | 50.95 | 95.10 | 144.3 | 2 | 2 |
| | 34 | 30/70 | | 1.13/1 | | 3.98/1 | 8.5 | 50.10 | 88.7 | 151.8 | 3 | 3 |
| | 35 | 30/70 | | 1.13/1 | | 3.98/1 | 8.0 | 50.51 | 88.9 | 162.3 | 0 | 4 |
| | 36 | 30/70 | | 1.13/1 | | 3.98/1 | 8.0 | 51.22 | 93.2 | 155.4 | 0 | 6 |
| | 37 | 30/70 | | 1.13/1 | | 3.98/1 | 9.0 | 50.56 | 95.9 | 160.6 | 4 | 4 |
| | 38 | 30/70 | | 1.13/1 | | 3.98/1 | 8.5 | 50.20 | 92.4 | 161.1 | 0 | 0 |
| | 39 | 30/70 | | 1.13/1 | | 3.98/1 | — | 49.21 | 90.5 | 146.5 | 0 | 3 |
| VA/BA 1 phase | 40 | NA | VA/BA | 4.00/1 | | | 6 | 50.7 | — | 148 | 4 | No shell |
| | 41 | NA | | 8.14/1 | | | 10 | 50.3 | — | 151 | 4 | |

[A]In this embodiment, 2-EHA is substituted for BA.
MFFT = minimum film forming temperature
PS = volume average particle diameter size
VA = vinyl acetate
BA = butyl acrylate
MMA = meth-methacrylate
2-EHA = 2-Ethylhexylacrylate Example 1 set forth the experimental procedures in details. Modifications of example 1 are highlighted in the subsequent examples, which demonstrate variations in accordance with the present invention. Comparative examples, which do not fall within the scope of the present invention, are also provided.

Example 1

Pre-Emulsion Preparation

The components in the table below for each stage of the pre-emulsions were added into an Erlenmeyer flask with agitation until a stable monomer emulsion was formed.

| Pre-emulsion Components (g) | Stage I | Stage II | Post addition |
|---|---|---|---|
| Deionized water (DI water) | 231 | 231 | |
| Sodium $C_{14}$-$C_{16}$ sulfonate | 0 | 0 | |
| Polyoxyethylene tridecyl ether phosphate, ammonium salt | 37 | 6 | 30 |
| Sodium dodecylbenzene sulfonate | 0 | 1 | |
| Diacetone acrylamide (DAAM) | 23 | 23 | |
| N-(2-Methacryloyl oxyethyl)ethylene urea (MEEU) | 13 | 13 | |
| Methacrylic acid (MAA) | 6.75 | 6.75 | |
| Methyl methacrylate (MMA) | 0 | 296 | |
| Butyl acrylate (BA) | 112 | 262 | |
| Vinyl acetate (VA) | 446 | 0 | |

Stage I (Core Formation)

To a three-neck 5 L reactor equipped with an agitator and temperature controller was added an amount of DI water (504 g), sodium $C_{14}$-$C_{16}$ sulfonate, 1.35 g, and sodium bicarbonate (1.2 g). The reactor was heated to 72.0° C. with N₂ sweep and agitated at a speed of 170-185 RPM. A seed charge of an initial Stage I pre-emulsion monomer solution was added followed by SPS (sodium persulfate, 2.23 g in 12.8 mL of DI water) to the reactor to form latex seeds. After the seeds were formed in about 20 minutes, the remaining Stage I monomer pre-emulsion was fed into the reactor at an increasingly rate as shown below.

About 1 ml/min. in 0.5 hour;
About 3 ml/min. in 0.75 hour;
About 6 ml/min. in 1.25 hour The temperature of the reactor was raised to maintain at about 74.0° C. in 1 hour during the course of the addition of the pre-emulsion solution. In about 2 hours of addition, the remaining stage I pre-emulsion was all added to the reactor and the content was stirred for another 15 min. An amount of SPS initiator aqueous solution (0.45 g in 10.75 ml of DI water, at 4.0% concentration by weight) was co-fed with the remaining monomer emulsion during the entire feed time of about 2 hours.

Stage II (Shell Formation)

After the Stage I monomer emulsion feed was finished, the temperature of the reactor was raised to 80.0° C. Then Stage II monomer emulsion was fed into the reactor. The total feed of Stage II monomer emulsion and a SPS solution (0.45 g in 10.75 ml of DI water, at 4.0% concentration by weight) was completed in about 3.5 hours. The Stage II pre-emulsion was fed into the reactor at an increasingly rate during the course of addition as shown below.

about 0.1 ml/min. at the beginning;
about 0.2 ml/min. in 1 hour,
about 0.5 ml/min. in 1.5 hour; and gradually increased to about 6 ml/min. in 2.75 h After 3.5 hours, the remaining Stage II pre-emulsion solution was all added to the reactor along with a post addition of polyoxyethylene tridecyl ether phosphate, ammonium salt, 30 g. The reactor was stirred for an additional 15 min and was cooled to 55° C. at the end.

The redox chasers t-BHP (i.e. tert-butyl hydroperoxide, 1.0 g in 21 ml of DI water) and 1.0 g of a sodium salt of an organic sulfinic acid derivative in 21 ml of DI water were added slowly to the batch for the residual monomer control and the remaining redox chasers was all added the end of 20 minutes. The reactor was then cooled to room temperature.

Example 2

The experimental procedure is similar to Example 1 with the following pre-emulsion ingredients. All amounts in the following table, and in the other tables directed to polymer particle formation, are in grams.

| Initial charge to the reactor | |
|---|---|
| DI water | 504 |
| Sodium C₁₄-C₁₆ sulfonate | 1.34 |
| Sodium bicarbonate | 1.2 |
| Charge Initiator Components | |
| Sodium persulfate (SPS) | 2.23 |
| DI water | 12.8 |

| Pre-emulsion Components | Stage I | Stage II |
|---|---|---|
| DI water | 277.2 | 184.8 |
| Polyoxyethylene tridecyl ether phosphate, ammonium salt | 40.7 | 8 |
| Sodium dodecylbenzene sulfonate | 0 | 1 |
| Diacetone acrylamide (DAAM) | 27.6 | 18.4 |
| N-(2-Methacryloyl oxyethyl)ethylene urea (MEEU) | 15.6 | 10.4 |
| Methacrylic acid (MAA) | 8.1 | 5.4 |
| Methyl methacrylate (MMA) | 0 | 236 |
| Butyl acrylate (BA) | 134 | 209 |
| Vinyl acetate (VA) | 536 | 0 |
| Feed Initiator Components | | |
| Sodium persulfate (SPS) | 0.54 | 0.36 |
| DI water | 12.9 | 8.6 |
| Redox Chasers | | |
| TBH (tert-butyl hydroperoxide) | | 1.9 |
| DI water | | 21 |
| Sodium salt of an organic sulfinic acid derivative | | 1.9 |
| DI water | | 21 |
| Base | | |
| NH₃ | | 0 |

Example 3

The experimental procedure is similar to Example 1 with the following pre-emulsion ingredients. This example includes the post addition process that employs 28.6 g polyoxyethylene tridecyl ether phosphate, ammonium salt.

| Initial charge to the reactor | |
|---|---|
| DI water | 504 |
| Sodium C₁₄-C₁₆ sulfonate | 1.35 |
| Sodium bicarbonate | 1.2 |
| Charge Initiator Components | |
| Sodium persulfate (SPS) | 2.23 |
| DI water | 12.8 |

| Pre-emulsion Components (g) | Stage I | Stage II | Post addition |
|---|---|---|---|
| DI water | 323 | 139 | |
| Polyoxyethylene tridecyl ether phosphate, ammonium salt | 44.8 | 8 | 28.6 |
| Sodium dodecylbenzene sulfonate | 0 | 1 | |
| Diacetone acrylamide (DAAM) | 32.2 | 13.8 | |
| N-(2-Methacryloyl oxyethyl)ethylene urea (MEEU) | 18.2 | 7.8 | |
| Methacrylic acid (MAA) | 9.45 | 4.05 | |
| Methyl methacrylate (MMA) | 0 | 177 | |
| Butyl acrylate (BA) | 156.24 | 157 | |
| Vinyl acetate (VA) | 625 | 0 | |
| Feed Initiator components | | | |
| Sodium persulfate (SPS) | 0.63 | 0.27 | |
| DI water | 15.05 | 6.45 | |
| Redox Chasers | | | |
| TBH (tert-butyl hydroperoxide) | | | 1.9 |
| DI water | | | 21 |
| Sodium salt of an organic sulfinic acid derivative | | | 1.9 |
| DI water | | | 21 |
| Base | | | |
| NH₃ | | | 0 |

Example 4

The experimental procedure is similar to Example 1 with the following pre-emulsion ingredients.

| Initial charge to the reactor | |
|---|---|
| DI water | 504 |
| Sodium C₁₄-C₁₆ sulfonate | 1.35 |
| Sodium bicarbonate | 1.2 |

-continued

| Charge Initiator Components | | |
|---|---|---|
| Sodium persulfate (SPS) | 2.23 | |
| DI water | 12.8 | |

| Pre-emulsion Components (g) | Stage I | Stage II |
|---|---|---|
| DI water | 370 | 92 |
| Sodium $C_{14}$-$C_{16}$ sulfonate | 13.26 | 0 |
| Polyoxyethylene tridecyl ether phosphate, ammonium salt | 38.3 | 10 |
| Diacetone acrylamide (DAAM) | 36.8 | 9.2 |
| N-(2-Methacryloyl oxyethyl)ethylene urea (MEEU) | 20.8 | 5.2 |
| Methacrylic acid (MAA) | 10.8 | 2.7 |
| Methyl methacrylate (MMA) | 474 | 0 |
| Butyl acrylate (BA) | 417.6 | 44.7 |
| Vinyl acetate (VA) | 0 | 178.7 |
| Feed Initiator Components | | |
| Sodium persulfate (SPS) | 0.9 | |
| DI water | 21.5 | |
| Redox Chasers | | |
| TBH (tert-butyl hydroperoxide) | | 1.9 |
| DI water | | 21 |
| Sodium salt of an organic sulfinic acid derivative | | 1.9 |
| DI water | | 21 |
| Base | | |
| $NH_3$ | | 0 |

Example 5

The experimental procedure is similar to Example 1 with the following ingredients.

| Initial charge to the reactor | | |
|---|---|---|
| DI water | 504 | |
| Sodium $C_{14}$-$C_{16}$ sulfonate | 1.35 | |
| Sodium bicarbonate | 1.2 | |
| Charge Initial Components | | |
| Sodium persulfate (SPS) | 2.23 | |
| DI water | 12.8 | |

| Pre-emulsion Components | Stage I | Stage II |
|---|---|---|
| DI water | 231 | 231 |
| Sodium $C_{14}$-$C_{16}$ sulfonate | 13.26 | 0 |
| Polyoxyethylene tridecyl ether phosphate, ammonium salt | 38.3 | 10 |
| Alkyl-phenol (APE)-free nonionic surfactant | 0 | 1.8 |
| Diacetone acrylamide (DAAM) | 23 | 23 |
| N-(2-Methacryloyl oxyethyl)ethylene urea (MEEU) | 13 | 13 |
| Methacrylic acid (MAA) | 6.75 | 6.75 |
| Methyl methacrylate (MMA) | 296 | 0 |
| Butyl acrylate (BA) | 262 | 112 |
| Vinyl acetate (VA) | 0 | 446 |
| Feed Initiator Components | | |
| Sodium persulfate (SPS) | 0.45 | 0.45 |
| DI water | 10.75 | 10.75 |
| Redox Chasers | | |
| TBH (tert-butyl hydroperoxide) | | 1.9 |
| DI water | | 21 |
| Sodium salt of an organic sulfinic acid derivative | | 1.9 |
| DI water | | 21 |
| Base | | |
| $NH_3$ | | 0 |

Example 6

The experimental procedure is similar to Example 1 with the following ingredients.

| Initial charge to the reactor | | |
|---|---|---|
| DI water | 504 | |
| Sodium $C_{14}$-$C_{16}$ sulfonate | 1.4 | |
| Sodium bicarbonate | 1.2 | |
| Charge Initiator Components | | |
| Sodium persulfate (SPS) | 2.23 | |
| DI water | 12.8 | |

| Pre-emulsion Components | Stage I | Stage II |
|---|---|---|
| DI water | 231 | 231 |
| Sodium $C_{14}$-$C_{16}$ sulfonate | 13.26 | 6.25 |
| Polyoxyethylene tridecyl ether phosphate, ammonium salt | 38.3 | 16.25 |
| APE-free nonionic surfactant | 0 | 1.8 |
| Diacetone acrylamide (DAAM) | 23 | 23 |
| N-(2-Methacryloyl oxyethyl)ethylene urea (MEEU) | 13 | 13 |
| Methacrylic acid (MAA) | 6.75 | 6.75 |
| Methyl methacrylate (MMA) | 296 | 0 |
| Butyl acrylate (BA) | 262 | 112 |
| Vinyl acetate (VA) | 0 | 446 |
| Feed Initiator Components | | |
| Sodium persulfate (SPS) | 0.45 | 0.45 |
| DI water | 10.75 | 10.75 |
| Redox Chasers | | |
| TBH (tert-butyl hydroperoxide) | | 1.9 |
| DI water | | 21 |
| Sodium salt of an organic sulfinic acid derivative | | 1.9 |
| DI water | | 21 |
| Base | | |
| $NH_3$ | | 0 |

Example 7

The experimental procedure is similar to Example 1 with the following ingredients.

| Initial charge to the reactor | | |
|---|---|---|
| DI water | 504 | |
| Sodium $C_{14}$-$C_{16}$ sulfonate | 1.35 | |
| Sodium bicarbonate | 1.2 | |
| Charge Initiator Components | | |
| Sodium persulfate (SPS) | 2.23 | |
| DI water | 12.8 | |

| Pre-emulsion Components | Stage I | Stage II |
|---|---|---|
| DI water | 138.6 | 323.4 |
| Sodium $C_{14}$-$C_{16}$ sulfonate | 4.94 | 8.75 |
| Polyoxyethylene tridecyl ether phosphate, ammonium salt | 14.36 | 25 |
| APE-free nonionic surfactant | 0 | 1.8 |
| Diacetone acrylamide (DAAM) | 13.8 | 32.2 |
| N-(2-Methacryloyl oxyethyl)ethylene urea (MEEU) | 7.8 | 18.2 |
| Methacrylic acid (MAA) | 4.05 | 9.45 |
| Methyl methacrylate (MMA) | 177.44 | 0 |
| Butyl acrylate (BA) | 157.36 | 156.24 |
| Vinyl acetate (VA) | 0 | 624.96 |
| Feed Initiator Components | | |
| Sodium persulfate (SPS) | 0.3 | 0.7 |
| DI water | 6.45 | 15.05 |

-continued

| Redox Chasers | |
|---|---|
| TBH (tert-butyl hydroperoxide) | 1.9 |
| DI water | 21 |
| Sodium salt of an organic sulfinic acid derivative | 1.9 |
| DI water | 21 |
| Base | |
| $NH_3$ | 0 |

Example 8

The experimental procedure is similar to Example 1 with the following ingredients.

| Initial charge to the reactor | |
|---|---|
| DI water | 504 |
| Sodium $C_{14}$-$C_{16}$ sulfonate | 1.35 |
| Sodium bicarbonate | 1.2 |
| Charge Initiator Components | |
| Sodium persulfate (SPS) | 2.23 |
| DI water | 12.8 |

| Pre-emulsion Components | Stage I | Stage II |
|---|---|---|
| DI water | 369.6 | 92.4 |
| Sodium $C_{14}$-$C_{16}$ sulfonate | 13.26 | 2.5 |
| Polyoxyethylene tridecyl ether phosphate, ammonium salt | 38.3 | 6.5 |
| APE-free nonionic surfactant | 0 | 1.8 |
| Diacetone acrylamide (DAAM) | 36.8 | 9.2 |
| N-(2-Methacryloyloxyethyl)ethylene urea (MEEU) | 20.8 | 5.2 |
| Methacrylic acid (MAA) | 10.8 | 2.7 |
| Methyl methacrylate (MMA) | 473.2 | 0 |
| Butyl acrylate (BA) | 419.6 | 47 |
| Vinyl acetate (VA) | 0 | 178.56 |
| Feed Initiator Components | | |
| Sodium persulfate (SPS) | 0.83 | 0.18 |
| DI water | 17.2 | 4.3 |
| Redox Chasers | | |
| TBH (tert-butyl hydroperoxide) | | 1.9 |
| DI water | | 21 |
| Sodium salt of an organic sulfinic acid derivative | | 1.9 |
| DI water | | 21 |
| Base | | |
| $NH_3$ | | 0 |

Example 9

The experimental procedure is similar to Example 1 with the following ingredients.

| Initial charge to the reactor | |
|---|---|
| DI water | 504 |
| Sodium $C_{14}$-$C_{16}$ sulfonate | 1.35 |
| Sodium bicarbonate | 1.2 |
| Charge Initiator Components | |
| Sodium persulfate (SPS) | 2.23 |
| DI water | 12.8 |

| Pre-emulsion Components | Stage I | Stage II |
|---|---|---|
| DI water | 46.2 | 415 |
| Sodium $C_{14}$-$C_{16}$ sulfonate | 16 | 15 |
| Polyoxyethylene tridecyl ether phosphate, ammonium salt | 4.77 | 41 |
| APE-free nonionic surfactant | 0 | 1.8 |
| Diacetone acrylamide (DAAM) | 4.6 | 41.4 |
| N-(2-Methacryloyloxyethyl)ethylene urea (MEEU) | 2.6 | 23.4 |
| Methacrylic acid (MAA) | 1.35 | 12.15 |
| Methyl methacrylate (MMA) | 59.148 | 0 |
| Butyl acrylate (BA) | 52.452 | 200.88 |
| Vinyl acetate (VA) | 0 | 803.52 |
| Feed Initiator Components | | |
| Sodium persulfate (SPS) | 0.1 | 0.9 |
| DI water | 2.15 | 19.35 |
| Redox Chasers | | |
| TBH (tert-butyl hydroperoxide) | | 1.9 |
| DI water | | 21 |
| Sodium salt of an organic sulfinic acid derivative | | 1.9 |
| DI water | | 21 |
| Base | | |
| $NH_3$ | | 0 |

Example 10

The experimental procedure is similar to Example 1 with the following ingredients.

| Initial charge to the reactor | |
|---|---|
| DI water | 822 |
| Sodium $C_{14}$-$C_{16}$ sulfonate | 2.2 |
| Sodium bicarbonate | 1.95 |
| Charge Initiator Components | |
| Sodium persulfate (SPS) | 3.64 |
| DI water | 20.88 |

| Pre-emulsion Components | Stage I | Stage II |
|---|---|---|
| DI water | 376.8 | 376.9 |
| Sodium $C_{14}$-$C_{16}$ sulfonate | 21.63 | 10.19 |
| Polyoxyethylene tridecyl ether phosphate, ammonium salt | 62.48 | 27.21 |
| APE-free nonionic surfactant | 0 | 3.01 |
| Diacetone acrylamide (DAAM) | 37.52 | 38.51 |
| N-(2-Methacryloyloxyethyl)ethylene urea (MEEU) | 21.2 | 21.77 |
| Methacrylic acid (MAA) | 11.3 | 11.3 |
| Methyl methacrylate (MMA) | 482.9 | 0 |
| Butyl acrylate (BA) | 427.4 | 187.5 |
| Vinyl acetate (VA) | 0 | 746.8 |
| Feed Initiator Components | | |
| Sodium persulfate (SPS) | 0.67 | 0.67 |
| DI water | 18 | 18 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| $NH_3$ | | 0 |

Example 11

The experimental procedure is similar to Example 1 with the following ingredients.

| Initial charge to the reactor | | |
|---|---|---|
| DI water | 822 | |
| Sodium C$_{14}$-C$_{16}$ sulfonate | 2.2 | |
| Sodium bicarbonate | 1.95 | |
| Charge Initiator Components | | |
| Sodium persulfate (SPS) | 3.64 | |
| DI water | 20.88 | |

| | Stage I | Stage II |
|---|---|---|
| Pre-emulsion Components | | |
| DI water | 376.8 | 376.9 |
| Sodium C$_{14}$-C$_{16}$ sulfonate | 21.63 | 10.19 |
| Polyoxyethylene tridecyl ether phosphate, ammonium salt | 62.48 | 77.21 |
| APE-free nonionic surfactant | 0 | 3.01 |
| Diacetone acrylamide (DAAM) | 37.52 | 38.51 |
| N-(2-Methacryloyloxyethyl)ethylene urea (MEEU) | 21.2 | 21.77 |
| Methacrylic acid (MAA) | 11.3 | 11.3 |
| Methyl methacrylate (MMA) | 482.9 | 0 |
| Butyl acrylate (BA) | 427.4 | 187.5 |
| Vinyl acetate (VA) | 0 | 746.8 |
| Feed Initiator Components | | |
| Sodium persulfate (SPS) | 0.67 | 0.67 |
| DI water | 18 | 18 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 12

The experimental procedure is similar to Example 1 with the following pre-emulsion ingredients.

| Initial charge to the reactor | | |
|---|---|---|
| DI water | 822 | |
| Sulfosuccinate surfactant mixture A | 3.00 | |
| Sodium bicarbonate | 1.9 | |
| Charge Initiator Components | | |
| Sodium persulfate (SPS) | 3.64 | |
| DI water | 20.88 | |

| | Stage I | Stage II |
|---|---|---|
| Pre-emulsion Components | | |
| DI water | 266.0 | 527.0 |
| Polyoxyethylene tridecyl ether phosphate | 23.5 | 40.8 |
| Sulfosuccinate surfactant mixture A | 10.3 | 10.3 |
| Sulfosuccinate surfactant mixture B | 17.0 | 19.0 |
| Diacetone acrylamide (DAAM) | 22.5 | 52.5 |
| N-(2-Methacryloyloxyethyl)ethylene urea (MEEU) | 12.7 | 29.7 |
| Methacrylic acid (MAA) | 6.6 | 15.4 |
| Methyl methacrylate (MMA) | 289.1 | 0 |
| Butyl acrylate (BA) | 256.6 | 254.8 |
| Vinyl acetate (VA) | 0 | 1019.3 |
| Feed Initiator components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 13

The experimental procedure is similar to Example 1 with the following pre-emulsion ingredients.

| Initial charge to the reactor | | |
|---|---|---|
| DI water | 833 | |
| Sodium C$_{14}$-C$_{16}$ sulfonate | 1.50 | |
| Sodium bicarbonate | 1.90 | |
| Charge Initiator Components | | |
| Sodium persulfate (SPS) | 3.64 | |
| DI water | 20.88 | |

| | Stage I | Stage II |
|---|---|---|
| Pre-emulsion Components | | |
| DI water | 266.0 | 527.0 |
| Polyoxyethylene tridecyl ether phosphate | 28.0 | 73.3 |
| Sulfosuccinate surfactant mixture A | 14.0 | 20.0 |
| Sulfosuccinate surfactant mixture B | 21.0 | 30.0 |
| Diacetone acrylamide (DAAM) | 23.0 | 52.5 |
| N-(2-Methacryloyloxyethyl)ethylene urea (MEEU) | 12.7 | 29.7 |
| Methacrylic acid (MAA) | 6.6 | 15.4 |
| Methyl methacrylate (MMA) | 289.1 | 0 |
| Butyl acrylate (BA) | 256.6 | 254.8 |
| Vinyl acetate (VA) | 0 | 1019.3 |
| Feed Initiator Components | | |
| Sodium persulfate (SPS) | 0.67 | 1.10 |
| DI water | 18.0 | 15.0 |
| Redox Chasers | | |
| TBH (tert-butyl hydroperoxide) | | 3.18 |
| DI water | | 30.0 |
| Sodium salt of an organic sulfinic acid derivative | | 3.18 |
| DI water | | 30.0 |
| Base | | |
| NH$_3$ | | 0 |

Example 14

The experimental procedure is similar to Example 1 with the following pre-emulsion ingredients.

| Initial charge to the reactor | | |
|---|---|---|
| DI water | 822 | |
| Sulfosuccinate surfactant mixture A | 3.00 | |
| Sodium bicarbonate | 1.9 | |

-continued

| Charge Initiator Components | | |
|---|---|---|
| Sodium persulfate (SPS) | 3.64 | |
| DI water | 20.88 | |

| | Stage I | Stage II |
|---|---|---|
| Pre-emulsion Components | | |
| DI water | 266.0 | 527.0 |
| Polyoxyethylene tridecyl ether phosphate | 23.5 | 40.8 |
| Sulfosuccinate surfactant mixture A | 10.3 | 10.3 |
| Sulfosuccinate surfactant mixture B | 17.0 | 19.0 |
| Diacetone acrylamide (DAAM) | 22.5 | 52.5 |
| N-(2-Methacryloyloxyethyl)ethylene urea (MEEU) | 12.7 | 29.7 |
| Methacrylic acid (MAA) | 6.6 | 15.4 |
| Methyl methacrylate (MMA) | 289.1 | 0 |
| Butyl acrylate (BA) | 256.6 | 254.8 |
| Vinyl acetate (VA) | 0 | 1019.3 |
| Sodium vinyl sulfonate (SVS) | | 54.25 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 15

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Initial Charge Components | |
| Sodium persulfate (SPS) | 3.64 |
| DI water | 20.88 |

| | Stage I | Stage II |
|---|---|---|
| Pre-emulsion Components | | |
| DI water | 266.0 | 527.0 |
| Polyoxyethylene tridecyl ether phosphate | 23.5 | 40.8 |
| Sulfosuccinate surfactant mixture A | 10.3 | 10.3 |
| Sulfosuccinate surfactant mixture B | 17.0 | 19.0 |
| Diacetone acrylamide (DAAM) | 22.5 | 52.5 |
| N-(2-Methacryloyloxyethyl)ethylene urea (MEEU) | 12.7 | 29.7 |
| Acrylic acid (AA) | 6.6 | 15.4 |
| Methyl methacrylate (MMA) | 289.1 | 0 |
| Butyl acrylate (BA) | 256.6 | 254.8 |
| Vinyl acetate (VA) | 0 | 1019.3 |
| Sodium vinyl sulfonate (SVS) | | 54.25 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 16

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

| | Stage I | Stage II |
|---|---|---|
| Pre-emulsion Components | | |
| DI water | 266.0 | 527.0 |
| Polyoxyethylene tridecyl ether phosphate | 23.5 | 40.8 |
| Sulfosuccinate surfactant mixture A | 10.3 | 10.3 |
| Sulfosuccinate surfactant mixture B | 17.0 | 19.0 |
| Diacetone acrylamide (DAAM) | 0 | 52.5 |
| N-(2-Methacryloyloxyethyl)ethylene urea (MEEU) | 12.7 | 29.7 |
| Acrylic acid (AA) | 6.6 | 15.4 |
| Methyl methacrylate (MMA) | 289.1 | 0 |
| Butyl acrylate (BA) | 256.6 | 254.8 |
| Vinyl acetate (VA) | 0 | 1019.3 |
| Sodium vinyl sulfonate (SVS) | | 40.70 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | 0 | 0 |

Example 17

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Initial Charge Components | |
| Sodium persulfate (SPS) | 3.64 |
| DI water | 20.88 |

-continued

| Pre-emulsion Components | Stage I | Stage II |
|---|---|---|
| DI water | 266.0 | 527.0 |
| Polyoxyethylene tridecyl ether phosphate | 23.5 | 40.8 |
| Sulfosuccinate surfactant mixture A | 10.3 | 10.3 |
| Sulfosuccinate surfactant mixture B | 17.0 | 19.0 |
| Diacetone acrylamide (DAAM) | 17.25 | 40.65 |
| N-(2-Methacryloyloxyethyl)ethylene urea (MEEU) | 12.70 | 29.70 |
| Acrylic acid (AA) | 6.6 | 15.4 |
| Methyl methacrylate (MMA) | 289.1 | 0 |
| Butyl acrylate (BA) | 256.6 | 140.15 |
| Vinyl acetate (VA) | 0 | 1133.95 |
| Sodium vinyl sulfonate (SVS) |  | 40.70 |
| Feed Initiator Components |  |  |
| Sodium persulfate (SPS) | 0.67 | 1.10 |
| DI water | 18.0 | 24.5 |
| Redox Chasers |  |  |
| TBH (tert-butyl hydroperoxide) |  | 3.18 |
| DI water |  | 35.16 |
| Sodium salt of an organic sulfinic acid derivative |  | 3.18 |
| DI water |  | 35.16 |
| Base |  |  |
| NH$_3$ |  | 0 |

Example 18

The experimental procedure is similar to Example 1 with the following pre-emulsion ingredients.

| Initial charge to the reactor |  |
|---|---|
| DI water | 822 |
| Sulfosuccinate surfactant mixture A | 3.00 |
| Sodium bicarbonate | 1.9 |
| Charge Initiator Components |  |
| Sodium persulfate (SPS) | 3.64 |
| DI water | 20.88 |

| Pre-emulsion Components | Stage I | Stage II |
|---|---|---|
| DI water | 266.0 | 527.0 |
| Polyoxyethylene tridecyl ether phosphate | 23.5 | 40.8 |
| Sulfosuccinate surfactant mixture A | 10.3 | 10.3 |
| Sulfosuccinate surfactant mixture B | 17.0 | 19.0 |
| Diacetone acrylamide (DAAM) | 17.25 | 40.65 |
| N-(2-Methacryloyloxyethyl)ethylene urea (MEEU) | 12.70 | 29.70 |
| Acrylic acid (AA) | 6.6 | 15.4 |
| Methyl methacrylate (MMA) | 289.1 | 0 |
| Butyl acrylate (BA) | 256.6 | 6171 |
| Vinyl acetate (VA) | 0 | 1210.40 |
| Sodium vinyl sulfonate (SVS) |  | 40.70 |
| Feed Initiator Components |  |  |
| Sodium persulfate (SPS) | 0.67 | 1.10 |
| DI water | 18.0 | 24.5 |
| Redox Chasers |  |  |
| TBH (tert-butyl hydroperoxide) |  | 3.18 |
| DI water |  | 35.16 |
| Sodium salt of an organic sulfinic acid derivative |  | 3.18 |
| DI water |  | 35.16 |
| Base |  |  |
| NH$_3$ |  | 0 |

Example 19

The experimental procedure is similar to Example 1 with the following pre-emulsion ingredients.

| Initial charge to the reactor |  |
|---|---|
| DI water | 822 |
| Sulfosuccinate surfactant mixture A | 3.00 |
| Sodium bicarbonate | 1.9 |
| Charge Initiator Components |  |
| Sodium persulfate (SPS) | 3.64 |
| DI water | 20.88 |

| Pre-emulsion Components | Stage I | Stage II |
|---|---|---|
| DI water | 266.0 | 527.0 |
| Polyoxyethylene tridecyl ether phosphate | 23.5 | 40.8 |
| Sulfosuccinate surfactant mixture A | 10.3 | 10.3 |
| Sulfosuccinate surfactant mixture B | 17.0 | 19.0 |
| Diacetone acrylamide (DAAM) | 17.25 | 40.65 |
| N-(2-Methacryloyloxyethyl)ethylene urea (MEEU) | 12.70 | 29.70 |
| Acrylic acid (AA) | 6.6 | 115.4 |
| Methyl methacrylate (MMA) | 289.1 | 0 |
| Butyl acrylate (BA) | 256.6 | 0 |
| 2-Ethylhexylacrylate (2-EHA) | 0 | 140.15 |
| Vinyl acetate (VA) | 0 | 1133.95 |
| Sodium vinyl sulfonate (SVS) |  | 40.70 |
| Feed initiator Components |  |  |
| Sodium persulfate (SPS) | 0.67 | 1.10 |
| DI water | 18.0 | 24.5 |
| Redox Chasers |  |  |
| TBH (tert-butyl hydroperoxide) |  | 3.18 |
| DI water |  | 35.16 |
| Sodium salt of an organic sulfinic acid derivative |  | 3.18 |
| DI water |  | 35.16 |
| Base |  |  |
| NH$_3$ |  | 0 |

Example 20

The experimental procedure is similar to Example 1 with the following pre-emulsion ingredients.

| Initial charge to the reactor |  |
|---|---|
| DI water | 822 |
| Sulfosuccinate surfactant mixture A | 3.00 |
| Sodium bicarbonate | 1.9 |
| Charge Initiator Components |  |
| Sodium persulfate (SPS) | 3.64 |
| DI water | 20.88 |

| Pre-emulsion Components | Stage I | Stage II |
|---|---|---|
| DI water | 250.0 | 550.0 |
| Polyoxyethylene tridecyl ether phosphate | 23.5 | 40.8 |
| Sulfosuccinate surfactant mixture A | 10.3 | 10.3 |
| Sulfosuccinate surfactant mixture B | 17.0 | 19.0 |
| Diacetone acrylamide (DAAM) | 22.50 | 53.25 |
| N-(2-Methacryloyloxyethyl)ethylene urea (MEEU) | 12.70 | 29.70 |
| Methyl methacrylate (MMA) | 289.1 | 0 |
| Butyl acrylate (BA) | 256.6 | 0 |
| 2-Ethylhexylacrylate (2-EHA) | 0 | 254.80 |

-continued

| | | |
|---|---|---|
| Vinyl acetate (VA) | 0 | 1019.28 |
| Methacrylic Acid (MAA) | 6.60 | 15.40 |
| Sodium vinyl sulfonate (SVS) | | 40.70 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 21

The experimental procedure is similar to Example 1 with the following pre-emulsion ingredients.

| Initial charge to the reactor | | |
|---|---|---|
| DI water | 822 | |
| Sulfosuccinate surfactant mixture A | 3.00 | |
| Sodium bicarbonate | 1.9 | |
| Charge Initiator Components | | |
| Sodium persulfate (SPS) | 3.64 | |
| DI water | 20.88 | |

| | Stage I | Stage II |
|---|---|---|
| Pre-emulsion Components | | |
| DI water | 250.0 | 550.0 |
| Polyoxyethylene tridecyl ether phosphate | 23.5 | 40.8 |
| Sulfosuccinate surfactant mixture A | 10.3 | 10.3 |
| Sulfosuccinate surfactant mixture B | 17.0 | 19.0 |
| Diacetone acrylamide (DAAM) | 22.50 | 53.25 |
| N-(2-Methacryloyloxyethyl)ethylene urea (MEEU) | 12.70 | 29.70 |
| Methyl methacrylate (MMA) | 289.1 | 0 |
| Butyl acrylate (BA) | 256.6 | 254.80 |
| Vinyl acetate (VA) | 0 | 1019.28 |
| Methacrylic Acid (MAA) | 6.60 | 15.40 |
| Sodium vinyl sulfonate (SYS) | | 40.70 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 318 |
| DI water | | 35.16 |
| Base | | |
| NH$_3$ | | 0 |

Example 22

The experimental procedure is similar to Example 1 with the following pre-emulsion ingredients.

| Initial charge to the reactor | | |
|---|---|---|
| DI water | 822 | |
| Sulfosuccinate surfactant mixture A | 3.00 | |
| Sodium bicarbonate | 1.9 | |
| Charge Initiator Components | | |
| Sodium persulfate (SPS) | 3.64 | |
| DI water | 20.88 | |

| | Stage I | Stage II |
|---|---|---|
| Pre-emulsion Components | | |
| DI water | 250.0 | 550.0 |
| Polyoxyethylene tridecyl ether phosphate | 23.83 | 40.8 |
| Sulfosuccinate surfactant mixture A | 10.3 | 10.3 |
| Sulfosuccinate surfactant mixture B | 17.0 | 19.0 |
| Diacetone acrylamide (DAAM) | 22.50 | 53.25 |
| N-(2-Methacrylol oxyethyl)ethylene urea (MEEU) | 12.70 | 29.70 |
| Methyl methacrylate (MMA) | 289.1 | 0 |
| Butyl acrylate (BA) | 256.6 | 0 |
| 2-Ethylhexylacrylate (2-EHA) | 0 | 254.80 |
| Vinyl acetate (VA) | 0 | 1019.28 |
| Methacrylic Acid (MAA) | 6.60 | 15.40 |
| Sodium vinyl sulfonate (SVS) | | 77.50 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 23

The experimental procedure is similar to Example 1 with the following pre-emulsion ingredients.

| Initial charge to the reactor | | |
|---|---|---|
| DI water | 822 | |
| Sulfosuccinate surfactant mixture A | 3.00 | |
| Sodium bicarbonate | 1.9 | |
| Charge Initiator Components | | |
| Sodium persulfate (SPS) | 3.64 | |
| DI water | 20.88 | |

| | Stage I | Stage II |
|---|---|---|
| Pre-emulsion Components | | |
| DI water | 250.0 | 550.0 |
| Polyoxyethylene tridecyl ether phosphate | 23.83 | 40.8 |
| Sulfosuccinate surfactant mixture A | 10.3 | 10.3 |
| Sulfosuccinate surfactant mixture B | 17.0 | 19.0 |
| Diacetone acrylamide (DAAM) | 22.50 | 53.25 |
| N-(2-Methacryloyl oxyethyl)ethylene urea (MEEU) | 12.70 | 29.70 |
| Methyl methacrylate (MMA) | 289.1 | 0 |
| Butyl acrylate (BA) | 256.6 | 254.80 |
| Vinyl acetate (VA) | 0 | 1019.28 |
| Methacrylic Acid (MAA) | 6.60 | 15.40 |
| Sodium vinyl sulfonate (SVS) | | 77.50 |
| Feed Initiator Components | | |
| Sodium persulfate (SPS) | 0.67 | 1.10 |
| DI water | 18.0 | 24.5 |

-continued

| Redox Chasers | |
|---|---|
| TBH (tert-butyl hydroperoxide) | 3.18 |
| DI water | 35.16 |
| Sodium salt of an organic sulfinic acid derivative | 3.18 |
| DI water | 35.16 |
| Base | |
| NH$_3$ | 0 |

Example 24

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

| | Stage I | Stage II |
|---|---|---|
| Pre-emulsion Components | | |
| DI water | 250.0 | 550.0 |
| Polyoxyethylene tridecyl ether phosphate | 23.50 | 40.8 |
| Sulfosuccinate surfactant mixture A | 10.30 | 10.3 |
| Sulfosuccinate surfactant mixture B | 17.00 | 19.0 |
| Diacetone acrylamide (DAAM) | 22.50 | 53.25 |
| N-(2-Methacryloyl oxyethyl)ethylene urea (MEEU) | 12.70 | 29.70 |
| Methyl methacrylate (MMA) | 289.1 | 0 |
| Butyl acrylate (BA) | 256.6 | 0 |
| 2-Ethylhexylacrylate (2-EHA) | 0 | 256 |
| Vinyl acetate (VA) | 0 | 1019.28 |
| Acrylic Acid (AA) | 6.60 | 15.40 |
| Sodium vinyl sulfonate (SVS) | | 40.70 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 25

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

| | Stage I | Stage II |
|---|---|---|
| Pre-emulsion Components | | |
| DI water | 250.0 | 550.0 |
| Polyoxyethylene tridecyl ether phosphate | 23.50 | 40.8 |
| Sulfosuccinate surfactant mixture A | 10.30 | 10.3 |
| Sulfosuccinate surfactant mixture B | 17.00 | 19.0 |
| Diacetone acrylamide (DAAM) | 22.50 | 53.25 |
| N-(2-Methacryloyl oxyethyl)ethylene urea (MEEU) | 12.70 | 29.70 |
| Methyl methacrylate (MMA) | 289.1 | 0 |
| Butyl acrylate (BA) | 256.6 | 0 |
| 2-Ethylhexylacrylate (2-EHA) | 0 | 254.80 |
| Vinyl acetate (VA) | 0 | 1019.28 |
| Methacrylic Acid (MAA) | 6.60 | 15.40 |
| Sodium vinyl sulfonate (SVS) | | 40.70 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 26

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

| | Stage I | Stage II |
|---|---|---|
| Pre-emulsion Components | | |
| DI water | 250.0 | 550.0 |
| Polyoxyethylene tridecyl ether phosphate | 23.50 | 40.8 |
| Sulfosuccinate surfactant mixture A | 10.30 | 10.3 |
| Sulfosuccinate surfactant mixture B | 17.00 | 19.0 |
| Diacetone acrylamide (DAAM) | 22.50 | 53.25 |
| N-(2-Methacryloyl oxyethyl)ethylene urea (MEEU) | 12.70 | 29.70 |
| Methyl methacrylate (MMA) | 289.1 | 0 |
| Butyl acrylate (BA) | 256.6 | 254.80 |
| Vinyl acetate (VA) | 0 | 1019.28 |
| Methacrylic Acid (MAA) | 6.60 | 15.40 |
| Sodium vinyl sulfonate (SVS) | | 40.70 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 27

The experimental procedure is similar to Example 1 with the following pre-emulsion ingredients. This example includes a third stage process that employs 40.80 g of an ether sulfate compound that is an anionic non-nonylphenol surfactant.

| Initial charge to the reactor | | | |
|---|---|---|---|
| DI water | 822 | | |
| Sulfosuccinate surfactant mixture A | 3.00 | | |
| Sodium bicarbonate | 1.9 | | |
| Charge Initiator Components | | | |
| Sodium persulfate (SPS) | 3.64 | | |
| DI water | 20.88 | | |
| | Stage I | Stage II | Stage III |
| Pre-emulsion Components | | | |
| DI water | 250.0 | 550.0 | |
| Polyoxyethylene tridecyl ether phosphate | 23.50 | 0 | |
| An ether sulfate compound (an anionic non-nonylphenol surfactant) | 0 | 0 | 40.80 |
| Sulfosuccinate surfactant mixture A | 10.30 | 10.3 | |
| Sulfosuccinate surfactant mixture B | 17.00 | 19.0 | |
| Diacetone acrylamide (DAAM) | 22.50 | 53.25 | |
| N-(2-Methacryloyl oxyethyl)ethylene urea (MEEU) | 12.70 | 29.70 | |
| Methyl methacrylate (MMA) | 289.1 | 0 | |
| Butyl acrylate (BA) | 256.6 | 254.80 | |
| Vinyl acetate (VA) | 0 | 1019.28 | |
| Methacrylic Acid (MAA) | 6.60 | 15.40 | |
| Sodium vinyl sulfonate (SVS) | | 40.70 | |
| Feed Initiator Components | | | |
| Sodium persulfate (SPS) | 0.67 | 1.10 | |
| DI water | 18.0 | 24.5 | |
| Redox Chasers | | | |
| TBH (tert-butyl hydroperoxide) | | | 3.18 |
| DI water | | | 35.16 |
| Sodium salt of an organic sulfinic acid derivative | | | 3.18 |
| DI water | | | 35.16 |
| Base | | | |
| NH₃ | | | 0 |

Example 28

The experimental procedure is similar to Example 1 with the following pre-emulsion ingredients. This example includes a third stage process that employs 19.38 g Methoxypolyethylene Glycol (MPEG) 750 (i.e., oxyalkylene polymer).

| Initial charge to the reactor | | | |
|---|---|---|---|
| DI water | 822 | | |
| Sulfosuccinate surfactant mixture A | 3.00 | | |
| Sodium bicarbonate | 1.9 | | |
| Charge Initiator Components | | | |
| Sodium persulfate (SPS) | 3.64 | | |
| DI water | 20.88 | | |
| | Stage I | Stage II | Stage III |
| Pre-emulsion Components | | | |
| DI water | 250.0 | 550.0 | |
| Polyoxyethylene tridecyl ether phosphate | 23.50 | 0 | |
| Methoxypolyethylene Glycol (MPEG) 750 | 0 | 0 | 19.38 |
| Sulfosuccinate surfactant mixture A | 10.30 | 10.3 | |
| Sulfosuccinate surfactant mixture B | 17.00 | 19.0 | |
| Diacetone acrylamide (DAAM) | 22.50 | 53.25 | |
| N-(2-Methacryloyl oxyethyl)ethylene urea (MEEU) | 12.70 | 29.70 | |
| Methyl methacrylate (MMA) | 289.1 | 0 | |
| Butyl acrylate (BA) | 256.6 | 254.80 | |
| Vinyl acetate (VA) | 0 | 1019.28 | |
| Methacrylic Acid (MAA) | 6.60 | 15.40 | |
| Sodium vinyl sulfonate (SVS) | | 77.50 | |
| Feed Initiator Components | | | |
| Sodium persulfate (SPS) | 0.67 | 1.10 | |
| DI water | 18.0 | 24.5 | |
| Redox Chasers | | | |
| TBH (tert-butyl hydroperoxide) | | | 3.18 |
| DI water | | | 35.16 |
| Sodium salt of an organic sulfinic acid derivative | | | 3.18 |
| DI water | | | 35.16 |
| Base | | | |
| NH₃ | | | 0 |

Example 29

The experimental procedure is similar to Example 1 with the following pre-emulsion ingredients.

| Initial charge to the reactor | | |
|---|---|---|
| DI water | 822 | |
| Sulfosuccinate surfactant mixture A | 3.00 | |
| Sodium bicarbonate | 1.9 | |
| Charge Initiator Components | | |
| Sodium persulfate (SPS) | 3.64 | |
| DI water | 20.88 | |
| | Stage I | Stage II |
| Pre-emulsion Components | | |
| DI water | 250.0 | 550.0 |
| Polyoxyethylene tridecyl ether phosphate | 23.83 | 40.8 |
| Sulfosuccinate surfactant mixture A | 10.30 | 10.3 |
| Sulfosuccinate surfactant mixture B | 17.00 | 19.0 |
| Diacetone acrylamide (DAAM) | 22.50 | 53.25 |
| N-(2-Methacryloyl oxyethyl)ethylene urea (MEEU) | 12.70 | 29.70 |
| Methyl methacrylate (MMA) | 289.1 | 0 |
| Butyl acrylate (BA) | 256.6 | 254.80 |
| Vinyl acetate (VA) | 0 | 1019.28 |
| Methacrylic Acid (MAA) | 6.60 | 15.40 |
| Sodium vinyl sulfonate (SVS) | | 77.50 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH₃ | | 0 |

Example 30

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

| Pre-emulsion Components | Stage I | Stage II |
|---|---|---|
| DI water | 250.0 | 550.0 |
| Polyoxyethylene tridecyl ether phosphate | 23.83 | 40.8 |
| Sulfosuccinate surfactant mixture A | 10.30 | 10.3 |
| Sulfosuccinate surfactant mixture B | 17.00 | 19.0 |
| Diacetone acrylamide (DAAM) | 22.50 | 53.25 |
| N-(2-Methacryloyl oxyethyl)ethylene urea (MEEU) | 12.70 | 29.70 |
| Methyl methacrylate (MMA) | 289.1 | 0 |
| Butyl acrylate (BA) | 256.6 | 0 |
| 2-Ethylhexylacrylate (2-EHA) | 0 | 254.80 |
| Vinyl acetate (VA) | 0 | 1019.28 |
| Methacrylic Acid (MAA) | 6.60 | 15.40 |
| Sodium vinyl sulfonate (SVS) | | 77.50 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 31

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

| Pre-emulsion Components | Stage I | Stage II |
|---|---|---|
| DI water | 226.0 | 527.0 |
| Polyoxyethylene tridecyl ether phosphate | 23.50 | 40.8 |
| Sulfosuccinate surfactant mixture A | 10.30 | 10.3 |
| Sulfosuccinate surfactant mixture B | 17.00 | 19.0 |
| Diacetone acrylamide (DAAM) | 22.50 | 53.00 |
| N-(2-Methacryloyl oxyethyl)ethylene urea (MEEU) | 12.70 | 29.70 |
| Methyl methacrylate (MMA) | 289.1 | 0 |
| Butyl acrylate (BA) | 256.6 | 0 |
| 2-Ethylhexylacrylate (2-EHA) | 0 | 254.80 |
| Vinyl acetate (VA) | 0 | 1019.28 |
| Methacrylic Acid (MAA) | 6.60 | 15.40 |
| Sodium vinyl sulfonate (SVS) | | 41.00 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 32

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

| Pre-emulsion Components | Stage I | Stage II |
|---|---|---|
| DI water | 226.0 | 527.0 |
| Polyoxyethylene tridecyl ether phosphate | 23.50 | 40.8 |
| Sulfosuccinate surfactant mixture A | 10.30 | 10.3 |
| Sulfosuccinate surfactant mixture B | 17.00 | 19.0 |
| Diacetone acrylamide (DAAM) | 0 | 0 |
| N-(2-Methacryloyl oxyethyl)ethylene urea (MEEU) | 12.70 | 29.70 |
| Methyl methacrylate (MMA) | 289.1 | 0 |
| Butyl acrylate (BA) | 256.6 | 0 |
| 2-Ethylhexylacrylate (2-EHA) | 0 | 254.80 |
| Vinyl acetate (VA) | 0 | 1019.28 |
| Methacrylic Acid (MAA) | 6.60 | 15.40 |
| Sodium vinyl sulfonate (SVS) | | 41.00 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 33

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

-continued

| Pre-emulsion Components | Stage I | Stage II |
|---|---|---|
| DI water | 226.0 | 527.0 |
| Polyoxyethylene tridecyl ether phosphate | 23.50 | 40.8 |
| Sulfosuccinate surfactant mixture A | 10.30 | 10.3 |
| Sulfosuccinate surfactant mixture B | 17.00 | 19.0 |
| Diacetone acrylamide (DAAM) | 11.50 | 27.00 |
| N-(2-Methacryloyl oxyethyl)ethylene urea (MEEU) | 12.70 | 29.70 |
| Methyl methacrylate (MMA) | 289.1 | 0 |
| Butyl acrylate (BA) | 256.6 | 0 |
| 2-Ethylhexylacrylate (2-EHA) | 0 | 254.80 |
| Vinyl acetate (VA) | 0 | 1019.28 |
| Methacrylic Acid (MAA) | 6.60 | 15.40 |
| Sodium vinyl sulfonate (SVS) |  | 41.00 |
| Feed Initiator Components |  |  |
| Sodium persulfate (SPS) | 0.67 | 1.10 |
| DI water | 18.0 | 24.5 |
| Redox Chasers |  |  |
| TBH (tert-butyl hydroperoxide) |  | 3.18 |
| DI water |  | 35.16 |
| Sodium salt of an organic sulfinic acid derivative |  | 3.18 |
| DI water |  | 35.16 |
| Base |  |  |
| NH₃ |  | 0 |

Example 34

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

| Pre-emulsion Components | Stage I | Stage II |
|---|---|---|
| DI water | 226.0 | 527.0 |
| Polyoxyethylene tridecyl ether phosphate | 23.50 | 40.8 |
| Sulfosuccinate surfactant mixture A | 10.30 | 10.3 |
| Sulfosuccinate surfactant mixture B | 17.00 | 19.0 |
| Diacetone acrylamide (DAAM) | 0 | 38.00 |
| N-(2-Methacryloyl oxyethyl)ethylene urea (MEEU) | 12.70 | 29.70 |
| Methyl methacrylate (MMA) | 289.1 | 0 |
| Butyl acrylate (BA) | 256.6 | 0 |
| 2-Ethylhexylacrylate (2-EHA) | 0 | 254.80 |
| Vinyl acetate (VA) | 0 | 1019.28 |
| Methacrylic Acid (MAA) | 6.60 | 15.40 |
| Sodium vinyl sulfonate (SVS) |  | 57.50 |
| Feed Initiator Components |  |  |
| Sodium persulfate (SPS) | 0.67 | 1.10 |
| DI water | 18.0 | 24.5 |
| Redox Chasers |  |  |
| TBH (tert-butyl hydroperoxide) |  | 3.18 |
| DI water |  | 35.16 |
| Sodium salt of an organic sulfinic acid derivative |  | 3.18 |
| DI water |  | 35.16 |
| Base |  |  |
| NH₃ |  | 0 |

Example 35

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

| Pre-emulsion Components | Stage I | Stage II |
|---|---|---|
| DI water | 226.0 | 527.0 |
| Polyoxyethylene tridecyl ether phosphate | 23.50 | 40.8 |
| Sulfosuccinate surfactant mixture A | 10.30 | 10.3 |
| Sulfosuccinate surfactant mixture B | 17.00 | 19.0 |
| Diacetone acrylamide (DAAM) | 0 | 57.55 |
| N-(2-Methacryloyl oxyethyl)ethylene urea (MEEU) | 12.70 | 29.70 |
| Methyl methacrylate (MMA) | 289.1 | 0 |
| Butyl acrylate (BA) | 256.6 | 0 |
| 2-Ethylhexylacrylate (2-EHA) | 0 | 254.80 |
| Vinyl acetate (VA) | 0 | 1019.28 |
| Methacrylic Acid (MAA) | 6.60 | 15.40 |
| Sodium vinyl sulfonate (SVS) |  | 57.50 |
| Feed Initiator Components |  |  |
| Sodium persulfate (SPS) | 0.67 | 1.10 |
| DI water | 18.0 | 24.5 |
| Redox Chasers |  |  |
| TBH (tert-butyl hydroperoxide) |  | 3.18 |
| DI water |  | 35.16 |
| Sodium salt of an organic sulfinic acid derivative |  | 3.18 |
| DI water |  | 35.16 |
| Base |  |  |
| NH₃ |  | 0 |

Example 36

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

| Pre-emulsion Components | Stage I | Stage 11 |
|---|---|---|
| DI water | 226.0 | 527.0 |
| Polyoxyethylene tridecyl ether phosphate | 23.50 | 40.8 |
| Sulfosuccinate surfactant mixture A | 10.30 | 10.3 |
| Sulfosuccinate surfactant mixture B | 17.00 | 19.0 |
| Diacetone acrylamide (DAAM) | 0 | 83.00 |
| N-(2-Methacryloyl oxyethyl)ethylene urea (WEU) | 12.70 | 29.7 |
| Methyl methacrylate (MMA) | 289.1 | 0 |
| Butyl acrylate (BA) | 256.6 | 0 |
| 2-Ethylhexylacrylate (2-EHA) | 0 | 254.80 |
| Vinyl acetate (VA) | 0 | 1019.28 |

-continued

| | | |
|---|---|---|
| Methacrylic Acid (MAA) | 6.60 | 15.40 |
| Sodium vinyl sulfonate (SVS) | | 57.50 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 37

The experimental procedure is similar to Example 1 with the following pre-emulsion ingredients.

| Initial charge to the reactor | |
|---|---|
| DI water | 822 |
| Sulfosuccinate surfactant mixture | 3.00 |
| Sodium bicarbonate | 1.9 |
| Charge Initiator Components | |
| Sodium persulfate (SPS) | 3.64 |
| DI water | 20.88 |

| | Stage I | Stage II |
|---|---|---|
| Pre-emulsion Components | | |
| DI water | 226.0 | 476.0 |
| DI b/c DAAM | 22.50 | 51.0 |
| Polyoxyethylene tridecyl ether phosphate | 23.50 | 40.8 |
| Sulfosuccinate surfactant mixture A | 10.30 | 10.3 |
| Sulfosuccinate surfactant mixture B | 17.00 | 19.0 |
| Diacetone acrylamide (DAAM) | 23.00 | 53.25 |
| N-(2-Methacryloyl oxyethyl)ethylene urea (MEEU) | 12.70 | 27.7 |
| Methyl methacrylate (MMA) | 289.1 | 0 |
| Butyl acrylate (BA) | 256.6 | 127.25 |
| 2-Ethythexylacrylate (2-EHA) | 0 | 127.25 |
| Vinyl acetate (VA) | 0 | 1019.28 |
| Methacrylic Acid (MAA) | 6.60 | 15.40 |
| Sodium vinyl sulfonate (SVS) | | 76.00 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 38

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

| | Stage I | Stage II |
|---|---|---|
| Pre-emulsion Components | | |
| DI water | 226.0 | 527.0 |
| Polyoxyethylene tridecyl ether phosphate | 23.50 | 40.8 |
| Sulfosuccinate surfactant mixture A | 10.30 | 10.3 |
| Sulfosuccinate surfactant mixture B | 17.00 | 19.0 |
| Diacetone acrylamide (DAAM) | 0 | 0 |
| N-(2-Methacryloyl oxyethyl)ethylene urea (MEEU) | 12.70 | 29.7 |
| Methyl methacrylate (MMA) | 289.1 | 0 |
| Butyl acrylate (BA) | 256.6 | 0 |
| 2-Ethylhexylacrylate (2-EHA) | 0 | 254.80 |
| Vinyl acetate (VA) | 0 | 1019.28 |
| Methacrylic Acid (MAA) | 6.60 | 15.40 |
| Sodium vinyl sulfonate (SVS) | | 74.50 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | | 3.18 |
| DI water | | 35.16 |
| Sodium salt of an organic sulfinic acid derivative | | 3.18 |
| DI water | | 35.16 |
| Base | | |
| NH$_3$ | | 0 |

Example 39

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

| | Stage I | Stage II |
|---|---|---|
| Pre-emulsion Components | | |
| DI water | 226.0 | 527.0 |
| Polyoxyethylene tridecyl ether phosphate | 23.50 | 40.8 |
| Sulfosuccinate surfactant mixture A | 10.30 | 10.3 |
| Sulfosuccinate surfactant mixture B | 17.00 | 19.0 |
| Diacetone acrylamide (DAAM) | 0 | 38.5 |
| N-(2-Methacryloyl oxyethyl)ethylene urea (MEEU) | 12.70 | 29.7 |
| Methyl methacrylate (MMA) | 289.1 | 0 |
| Butyl acrylate (BA) | 256.6 | 0 |
| 2-Ethylhexylacrylate (2-EHA) | 0 | 254.80 |
| Vinyl acetate (VA) | 0 | 1019.28 |
| Methacrylic Acid (MAA) | 6.60 | 15.40 |
| Sodium vinyl sulfonate (SVS) | | 77.6 |
| Feed Initiator Components | | |
| Sodium persulfate (SPS) | 0.67 | 1.10 |
| DI water | 18.0 | 24.5 |

-continued

| Redox Chasers | |
|---|---|
| TBH (tert-butyl hydroperoxide) | 3.18 |
| DI water | 35.16 |
| Sodium salt of an organic sulfinic acid derivative | 3.18 |
| DI water | 35.16 |
| Base | |
| NH₃ | 0 |

Comparative Example 40

The experimental procedure is similar to Example 1 with the following ingredients.

| Initial charge to the reactor | |
|---|---|
| DI water | 504 |
| Sodium C₁₄-C₁₆ sulfonate | 1.35 |
| Sodium bicarbonate | 1.20 |
| Charge Initiator Components | |
| Sodium persulfate (SPS) | 2.23 |
| DI water | 12.8 |

| | Stage I | Stage II |
|---|---|---|
| Pre-emulsion Components | | |
| DI water | 462 | |
| Sodium C₁₄-C₁₆ sulfonate | 16.5 | |
| Polyoxyethylene tridecyl ether phosphate, ammonium salt | 47.9 | |
| APE-free nonionic surfactant | 1.8 | |
| Diacetone acrylamide (DAAM) | 46 | |
| N-(2-Methacryloyl oxyethyl)ethylene urea (MEEU) | 26 | |
| Methacrylic acid (MAA) | 13.5 | |
| Methyl methacrylate (MMA) | 0 | |
| Butyl acrylate (BA) | 223.2 | |
| Vinyl acetate (VA) | 892.8 | |
| Feed Initiator Components | | |
| Sodium persulfate (SPS) | 1 | |
| DI water | 21.5 | |
| Redox Chasers | | |
| TBH (tert-butyl hydroperoxide) | 1.9 | |
| DI water | 21 | |
| Sodium salt of an organic sulfinic acid derivative | 1.9 | |
| DI water | 21 | |
| Base | | |
| NH₃ | 0 | |

Comparative Example 41

The experimental procedure is similar to Example 1 with the following ingredients.

| Initial charge to the reactor | |
|---|---|
| DI water | 504 |
| Sodium C₁₄-C₁₆ sulfonate | 1.35 |
| Sodium bicarbonate | 1.20 |
| Charge Initiator Components | |
| Sodium persulfate (SPS) | 2.23 |
| DI water | 12.8 |

| | Stage I | Stage II |
|---|---|---|
| Pre-emulsion Components | | |
| DI water | 462 | |
| Sodium C₁₄-C₁₆ sulfonate | 16.5 | |
| Polyoxyethylene tridecyl ether phosphate, ammonium salt | 47.9 | |
| APE-free nonionic surfactant | 1.8 | |
| Diacetone acrylamide (DAAM) | 46 | |
| N-(2-Methacryloyl oxyethyl)ethylene urea (MEED) | 26 | |
| Methacrylic acid (MAA) | 13.5 | |
| Methyl methacrylate (MMA) | 0 | |
| Butyl acrylate (BA) | 122.76 | |
| Vinyl acetate (VA) | 993.24 | |
| Feed Initiator Components | | |
| Sodium persulfate (SPS) | 1 | |
| DI water | 21.5 | |
| Redox Chasers | | |
| TBH (tert-butyl hydroperoxide) | 1.9 | |
| DI water | 41 | |
| Sodium salt of an organic sulfinic acid derivative | 1.9 | |
| DI water | 41 | |
| Base | | |
| NH₃ | 0 | |

Example 42

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

| | Stage I | Stage II |
|---|---|---|
| Pre-emulsion Components (g) | | |
| DI water | 562 | 226 |
| Polyoxyethylene tridecyl ether phosphate, ammonium salt | 40.8 | 23.5 |
| Sulfosuccinate surfactant mixture A | 10.3 | 10.3 |
| Sulfosuccinate surfactant mixture B | 19.0 | 17.0 |
| Diacetone acrylamide (DAAM) | 32.6 | 25.0 |
| N-(2-Methacryloyl oxyethyl)ethylene urea (MEEU) | 29.7 | 12.7 |
| 2-Ethylhexylacrylate (2-EHA) | 254.8 | 0 |
| Butyl acrylate (BA) | 0 | 256.6 |
| Methacrylic acid (MAA) | 15.4 | 6.6 |
| Methyl methacrylate (MMA) | 0 | 289.1 |
| Vinyl acetate (VA) | 1019.3 | 0 |
| Sodium vinyl sulfonate (SVS) | 57.50 | 0 |
| Feed Initiator Components | | |
| Sodium persulfate (SPS) | 0.67 | 1.10 |
| DI water | 18.0 | 24.5 |
| Redox Chasers | | |
| TBH (tert-butyl hydroperoxide) | 3.18 | |
| DI water | 35.16 | |

| | |
|---|---|
| Sodium salt of an organic sulfinic acid derivative | 3.18 |
| DI water | 35.16 |
| Base | |
| NH$_3$ | 0 |

Example 43

The experimental procedure is similar to Example 1 with the following pre-emulsion ingredients.

| Initial charge to the reactor | |
|---|---|
| DI water | 822 |
| Sulfosuccinate surfactant mixture A | 3.00 |
| Sodium bicarbonate | 1.9 |
| Charge Initiator Components | |
| Sodium persulfate (SPS) | 3.64 |
| DI water | 20.88 |

| Pre-emulsion Components | Stage I | Stage II |
|---|---|---|
| DI water | 526 | 226 |
| Polyoxyethylene tridecyl ether phosphate, ammonium salt | 40.8 | 23.5 |
| Sulfosuccinate surfactant mixture A | 10.3 | 10.3 |
| Sulfosuccinate surfactant mixture B | 19.0 | 17.0 |
| Diacetone acrylamide (DAAM) | 0 | 36.0 |
| N-(2-Methacryloyl oxyethyl)ethylene urea (MEEU) | 19.7 | 12.7 |
| 2-Ethylhexylacrylate (2-EHA) | 254.8 | 0 |
| Butyl acrylate (BA) | 0 | 256.6 |
| Methacrylic acid (MAA) | 15.4 | 6.6 |
| Methyl methacrylate (MMA) | 0 | 289.1 |
| Vinyl acetate (VA) | 1019.3 | 0 |
| Sodium vinyl sulfonate (SVS) | 77.5 | 0 |
| Feed Initiator Components | | |
| Sodium persulfate (SPS) | 1.10 | 0.67 |
| DI water | 24.50 | 18.00 |
| Redox Chasers | | |
| TBH (tert-butyl hydroperoxide) | 3.18 | |
| DI water | 35.16 | |
| Sodium salt of an organic sulfinic acid derivative | 3.18 | |
| DI water | 35.16 | |
| Base | | |
| NH$_3$ | 0 | |

Examples of Paint Made with Hybrid Core-Shell Particles

The following Table II compiles data comparing Standard 804-44 (5281A AURA semi-gloss) paint composition that includes 30/70 core-shell weight ratio with no DAAM, with paint composition that includes 30/70 core-shell weight ratio with 4% DAAM by weight throughout the hybrid particles, and with paint composition that includes 30/70 core-shell weight ratio with 3% DAAM by weight in the shell only.

TABLE II

Data for Paints Made with Acrylic Core and Vinyl-Acrylic Shell Latex

| Description | Comparative 1 | Comparative 2 | Comparative 3 | Inventive 1 | Inventive 2 |
|---|---|---|---|---|---|
| | 100% Acrylic Production Formula with open time extender$^A$ | 100% Acrylic No open time extender and no additive to improve wetting and leveling | 30/70 Acrylic core-vinyl acrylic e shell 20% 2-EHA, MAA, SVS, No DAAM | 30/70 Acrylic core-vinyl acrylic shell 20% 2-EHA, MAA, SVS, 4% DAAM throughout core and shell | 30/70 Acrylic core-vinyl acrylic shell 26% 2-EHA, MAA, SVS, 3% DAAM (shell only) |
| viscosity (KU)$^B$ | 100.8 | 101.4 | 98.1 | 97.6 | 98.1 |
| viscosity P$^C$ | 1.17 | 1.3 | 1.029 | 1.137 | 1.112 |
| pH | 8.6 | 8.67 | 8.17 | 8 | 8.49 |
| Sag | 12 | 12 | 10 | 10 | 11 |
| Flow & Leveling $^D$ | 6 | 6 | 8 | 8 | 8 |
| Air Dry Gloss .003 DD | 51.8 | 55.5 | 52.9 | 54.5 | 53.5 |
| Air Dry Sheen .003 DD | 83.4 | 78.7 | 87.1 | 93.4 | 92.6 |
| ASTM Wet Adhesion 7 day 3 min | 4.5 | 5 | 4.5 | 5 | 5 |
| ASTM Wet Adhesion 7 day 5 min | 5 | 4.5 | 1 (worst) | 5 | 5 |
| Wet Adhesion 7 day (Scratch Test) | 3 | 3 | 1 (worst) | 3 | 3 |

TABLE II-continued

Data for Paints Made with Acrylic Core and Vinyl-Acrylic Shell Latex

| Description | Comparative 1 | Comparative 2 | Comparative 3 | Inventive 1 | Inventive 2 |
|---|---|---|---|---|---|
| Block Resistance 1 Day 120° F. | 3 (moderate tack) | 4 | 1 (severe) | 2 | 3 |
| Low Temp Coalescence 50° F. | 1 (pass) | 1 | 1 (pass) | 1 | 1 |
| ASTM Scrub Resistance 7 Day Dry | 1389 | 2554 | 220 | 1352 | 1769 |
| ASTM Scrub Resistance 7 Day Dry (First Break) | 1194 | 3155 | 180 | 1133 | 1129 |
| Stain Removal Flat (Litter Stain) Cycles | 10 | 100+ | 5 | 10 | 10 |
| Stain Removal Non-Flat (TTP-29 stain) Cycles | 10 | 100+ | 10 | 10 | 10 |
| Water Sensitivity (Thumb Scratch) 1 min | 4 | 5 | 2 | 4.5 | 5 |
| Water Sensitivity (Thumb Scratch) 2 min | 4 | 5 | 2 | 3 | 3 |
| Water Sensitivity (Thumb Scratch) 3 min | 4 | 5 | 2 | 3 | 3 |
| Water Stain (Water Spotting) 7-day dry | 2 (poor) | 4.5 | 2 | 3 | 2 |
| Wine Stain | STD: 3 (good) | | Better than STD | Better than STD | Better than STD |
| Real World Brushout (Open Time) | 2 (poor) (dry ~5 min) | 2 (dry ~5 min) | Not tested [E] | 4 (very good) (dry ~7 min) | 3 (dry ~6 min) |
| Real World Brushout (application) | 4 (very good) | 3 (average) | Not tested [E] | 4 (very good) | 4 (very good) |
| Brush Mark Test (Flow and Leveling) | 2 (ok) | 2 (ok) | Not tested [E] | 4 (very good) | 4 (very good) |
| Real World Ranking (Final Dry Appearance/ Finish) | 3rd | 4th (worst) | Not tested [E] | 1st (best) | 2nd |

[A] Open time extender is a water-soluable acrylic polymer resin designed to retard the drying rate of water-based paint.
[B] Stormer (KU) viscosity (mid-shear viscosity), in Krebs Units (KU)
[C] ICI viscosity (high shear viscosity), P
[D] Leneta Flow & Leveling test (0-10 10 = best)
[E] Not tested due to very poor scrub resistance (poor durability)

Material and Methods and Analysis of Data from Table II

Particle size distribution is determined by Microtrac 250 particle size analyzer using light scattering technology. Particle size (ps) reported herein is volume average particle size unless otherwise stated.

The viscosity of paint compositions were obtained using analysis methods in accordance with standardized methods (e.g., stormer viscosity for mid-shear viscosity, reported in Kreb Units (KU); ICI viscosity for high-shear viscosity, reported in Poise (P)). A higher stormer viscosity indicates a higher load of the brush and the forming of a better film. Viscosity measurements were obtained using a Bohlin CVO Rotational Viscometer (0.5° cone and 4 mm diameter plate). As evident from Table II, the KU viscosity, ICI viscosity, and pH of the inventive and comparative paint compositions are similar.

Paint "sag" is a downward drooping movement of paint that occurs immediately after application. See, e.g., http://www.benjaminmoore.com/en-us/for-contractors/sagging. Sagging measurements of liquid paint is made using a graduated metal applicator that applies the paint on a white-black card, and then the card is positioned vertically. The gradation values of the sagging paint are then read to determine sag resistance in accordance with ASTM D 4400. A higher number indicates more sagging of the paint film. Table II shows that the sag of the inventive paint compositions is at least as good as, if not better than, the sag of comparative acrylic paint compositions.

"Leneta Flow & Leveling" test pertains to a known flow and leveling test. See, e.g., http://www.leneta.com/leveling-test.html and ASTM D 4062. For each sample, containing either an inventive or conventional paint composition, a drawdown was made with a flow leveling bar and dried overnight. Thereafter, a rating of 1 to 10 was assigned, with 10 being the best (i.e., perfectly flat on the drawdown card) and 1 being the worst. Table II shows that the Leneta flow and leveling properties of the inventive paint compositions are substantially better than the comparative paint compositions employing 100% acrylic particles.

Paints come in a variety of finish gloss levels, which correspond to different levels of specular reflection. To ascertain the gloss of inventive and comparative paint compositions, an air dry gloss 0.003 drawdown (DD) test was performed, which included air drying a 3 mil DD paint film and then determining its gloss at a preselected reflecting angle of 600 from the vertical using a standardized meter in accordance with ASTM D 523 ("Standard Test Method for Specular Gloss"). Gloss ratings by this test method are thus obtained by comparing the reflectance from the specimen to that from a polished glass standard at a reflecting angle of 60°. To ascertain the sheen of inventive and comparative paint compositions, an air dry sheen 0.003 drawdown (DD) test was performed, which included air drying a 3 mil DD paint film and then determining its sheen at a preselected reflecting angle of 85° from the vertical using a standardized meter in accordance with ASTM D 523. Sheen ratings by this test method are thus obtained by comparing the reflectance from the specimen to that from a polished glass standard at a reflecting angle of 85°. Gloss and sheen pertain to the shininess of the dried paint's surface. Traditional semi-gloss paints have a gloss at 60° of 35-70 units. Table II paint data shows that all of the evaluated paints are semi-gloss. The sheen for all these evaluated paints are also similar.

The degree of attachment between the inventive and comparative paint compositions and the underlying material it is in contact with is assessed by a Wet Adhesion ASTM 7 day 3 min test, a Wet Adhesion ASTM 7 day 5 minute test, and a Wet Adhesion ASTM 7 day test (Scratch Test). The Wet Adhesion ASTM 7 day 3 minute test and the Wet Adhesion ASTM 7 day 5 min test and the Wet Adhesion ASTM 7 day test (Scratch Test) were performed on glossy alkyd panels, which are substrates of high gloss paints (IMPERVO® Alkyd High Gloss Metal & Wood Enamel Wet Adhesion Paint) that were dried in an oven at 120° F. for 24 hours. Various 3-mil thick drawdown coatings of the inventive aqueous paint compositions were applied to the glossy alkyd panels and let dry for about 7 days at ambient conditions.

The Wet Adhesion ASTM 7 day 3 min test and the Wet Adhesion ASTM 7 day 5 min test included, after dry curing, placing the coated panels in a fog box, simulating rain conditions at 100% humidity, for about 3 minutes and 5 minutes, respectively, and were then dried in air at ambient conditions for about 1 hour prior to the Cross-hatch Adhesion test using adhesive tape, as detailed in ASTM D3359 Method B. The percentage of peeling (area) for each sample is rated on a 5-point scale as follows: 5=no peeling or flaking, 4=less than 5% peeling or flaking, 3=5-15% peeling or flaking, 2=15-35% peeling or flaking, 1=35-65% peeling or flaking, and 0=greater than 65% peeling or flaking. As evident from Table II, the inventive paint samples exhibited no peeling during the Wet Adhesion ASTM 7 day 3 min test and the Wet Adhesion ASTM 7 day 5 min test, whereas the comparative paint samples exhibited more peeling.

The Wet Adhesion ASTM 7 day (Scratch Test) is similar to the other two wet adhesion tests, except that after the seven day cure, the samples are placed in the 100% relative humidity environment of the fog box (humidity chamber) for one hour. Then the samples are inspected for blisters or other blemishes, and a fingernail scratch or thumb rub test can be used to check for adhesion. Adhesion is assessed using a 5-point scale, which ranks for adhesion strength from 1 to 5, with 5 being the best and 1 the worst according to the following scale: 1=scratch off easy; 2=scratched off with some force; 3=scratch some portions off with force; 4=scratch slightly off with strong force; and 5=cannot scratch off. As evident from Table II, all of the paint samples exhibited deterioration in adhesion with the longer exposure to 100% humidity, although the comparative paint sample comprising acrylic-vinyl acrylic core-shell particles made without DAAM exhibited the most pronounced adhesion deterioration. This finding, coupled with the Wet Adhesion ASTM 7 day 5 min test results, shows how humidity degrades adhesion for paint comprising acrylic-vinyl acrylic core shell particles made without DAAM.

Block resistance, or the propensity of a coating to adhere to itself instead of to its substrate, was measured according to a modified version of ASTM D4946-89, which is referred to as the Block Resistance 1 Day 120° F. test. According to this test, on a sealed white Leneta™ WK card, a 3 mil thick coating of the inventive or comparative paint composition was prepared. After one week of drying at room temperature, the cured coating was cut into four one inch squares. Two of the squares were oriented face to face (i.e., coated sides touching) and are placed under a 100-gram weight in a 120° F. oven for about 24 hours. The other two of the squares were oriented face to face and placed under a 100-gram weight at room temperature for about 24 hours. Both sets of face to face squares were then allowed to equilibrate to ambient temperature for about ½ hour. Each set of squares was then pulled apart using a slow and steady force, forming a T pattern. Block resistance was rated based on the percentage of area of the paint on one surface that was transferred to the other surface. 0% transfer indicates a perfect blocking resistance, which is assigned a score of 5 on a 5-point scale, while 100% transfer indicate that paints on both sides are completely stuck together, which is assigned a score of 1 on the 5-point scale. Table II shows that block resistance for inventive and comparative paint samples is about the same, except that the comparative paint comprising acrylic-vinyl acrylic core shell particles made without DAAM exhibited the most transfer of paint from one surface to the other surface.

Low-temperature coalescence at 50° F. was measured according to a modified version of ASTM D3793. For each sample of paint, a number of 6"×12" Upson panels were cooled to about 50° F. for about 1 hour. On one half (6"×6" portion) of each panel, a draw down coating of each composition was prepared having a thickness starting at about 1 mils and going to about 24 mils. These panels were then kept about 50° F. in a refrigerator for about 24 hours, and were allowed to recover for about ½ hour at room temperature, after which point the panels were left overnight. The presence or absence of visible cracks on each panel was noted and rated from 1 to 24, based on the thinnest panel on which cracks were first evident, with each number representing its mil-thickness, and with 24 representing that either only the 24-mil thick panel or none of the panels showed cracks. As evident from Table II, all of the paint samples had similar low-temperature coalescence properties.

Scrub resistance was measured according to a modified version of ASTM D2486 Method B, and this test is referred to herein as the Scrub Resistance 7 Day Dry test. A scrub panel was created with three 9"-wide draw down coatings of samples of about 7 mils thickness prepared side by side (at least one of the samples should be a control sample) and allowed to cure horizontally for about 2 weeks at room temperature (e.g., from about 20-25° C.). Black scrub panels were preferably used for coating compositions that are white, pastel, and medium colors. In addition, an extra scrub panel was used as a conditioning panel. On a Gardner™ Abrasion Tester, the night before testing, a medium bristle brush was soaked in DI water overnight. Just before the testing, the excess water was shaken from the brush, and the brush was placed in the brush holder. Before testing the scrub panels, the conditioning panel was secured in the Gardner™ Abrasion Tester. With a wooden tongue depressor, about 10 grams of abrasive scrub medium was applied to the brush, and about 5 cc of DI water was syringed evenly across the panel in the area to be scrubbed. The conditioning panel was scrubbed for about 400 cycles. Thereafter, the conditioning panel was removed and discarded, the brush was washed with water, and each scrub panel was secured in the Gardner™ Abrasion Tester. Like with the conditioning panel, the abrasive scrub medium was applied to the brush, and the water was applied to the panel. The scrub panel was then scrubbed for a maximum of about 2000 cycles (typically about 1 hour). About every 100 cycles, excess scrub medium was moved from outside the scrub area to inside the scrub area. About every 400 cycles, another 10 grams of scrub medium is added to the brush, and another 5 cc of DI water was syringed onto the scrub area. The number of cycles it took to remove one continuous line of each coating was noted. This process was repeated for each scrub panel.

Scrub resistance was also measured by ASTM Method D2846, and this test is referred to herein as the Scrub Resistance 7 Day Dry test (first break). In this test, a 7 mil drawdown of paint(s) is prepared on a scrub panel and allowed to air dry at room temperature for one week. A medium bristle brush is soaked overnight in deionized water for conditioning prior to running the test. Two glass plates are placed in the tray of the Abrasion tester, and three brass shims are placed on the plates in such a way that each paint being tested will have a shim under it. The test panel with the dried paint is secured to the two glass plates on the Gardner Abrasion Tester. Ten grams of abrasive scrub medium are applied to the bristles of the brush and the brush is then placed in a brush holder which is secured to the cables of the Abrasion Tester. Five cc of deionized water is applied to the test panel, and the scrub cycles are started. Every 400 cycles another 10 g of abrasive medium is applied to the brush and another 5 cc of deionized water is applied to the panel. The test is continued until paint is removed in one continuous line across its own shim and the number of cycles required to reach this point is recorded.

As evident from Table II, scrub resistance measured by both scrub resistance tests demonstrated that scrub resistance for the Comparative 1 acrylic paint and the inventive paint samples were similar, and that the scrub resistance for Comparative 2 without an open time extender was substantially greater than the other paint compositions tested. On the other hand, the scrub resistance of Comparative 3 comprising acrylic core-vinyl acrylic shell particles without DAAM was substantially less than the other paint compositions tested. In fact, the scrub resistance of Comparative 3 was low suggesting that its durability to scrubbing renders it unsuitable for commercial use. Therefore, Comparative 3 was not included in the additional tests discussed below.

Stain removal testing was conducted in accordance with ASTM D4828 in order to evaluate the ease of stain removal caused by a test stain material and by litter. The samples of inventive and comparative paint compositions were drawn down on a black vinyl chart and allowed to dry for 7 days in a constant temperature and humidity room at 77° F. and 30% relative humidity. Stains, TTP-29 (ASTM D3450 black stain), and litter (ASTM 2198) were applied in separate tests to the film and allowed to stand for 2 hours. Excess stain was gently wiped using laboratory tissue, and then placed upon a Washability tester fitted with a sponge. The sponge was saturated with a 1% solution of a cleaning solution containing ethoxylated alcohol and lauryl polyglucose in water (S. C. Johnson & Son, Inc.), and the soiled film subjected to repeated scrub cycles until the stain was removed. Results are assessed based on the number of scrub cycles required to remove the stain, so the fewer number of cycles needed to remove the stain the better the ease of stain removal exhibited by the paint. Stain removal for litter stain and stain removal for TTP-29 stain have been tested separately and are reported separately. Table 11 paint data shows that the number of cycles required to remove litter stain and TTP-29 stain were about the same, with the exception that it was very difficult to remove stains from the acrylic paint formulated without an open time extender (a water-soluable acrylic polymer resin). This finding is consistent with the high scrub resistance for this comparative acrylic paint sample.

A water sensitivity test (1 minute, 2 minutes and 3 minutes water spot test) is illustrated by the following procedures. Emulsion latex samples were drawn down on a sealed Leneta card (made by BYK for example) to form a dry film using a BYK-GARDNER 3 MIL WET FILM draw down bar. The latex film was air-dried on a flat horizontal surface for one week before testing. To the dried film surface, 3-5 drops of water were placed and the water sensitivity of the latex film was rated using a finger nail scratching method for rating the dry film strength after 1 minute and 5 minute soaking periods. The wet films are rated for resistance to finger nail scratching from 1 to 5, with 5 being the best and 1 being the worst. Table II shows that the comparative acrylic paints had the least degree of sensitivity to water, as expected. The paint data further shows that comparative 3 comprising acrylic-vinyl core shell particles made without DAAM was the most sensitive to water.

The water stain (water spotting) 7-day dry test tests water stain resistance by a visual rating of water stain on the dried paint film. A 3 mil film of paint is dried for 7 days at room temperature, and 3 ml of DI water is placed on the horizontal dried paint film for 3 minutes, and then the Leneta card is raised to a vertical position to allow water to flow down across the surface of the film. The film is placed in a vertical position while the water evaporates. The water stain mark on the film surface is visually inspected and assigned a number from 1 to 5, with 5 being the best and 1 being the worst. Table II shows that Comparative 1 and the inventive paints had similar characteristic with respect to water spotting. The paint data further shows that Comparative 2 exhibited the most resistance to water spotting.

The ability of inventive and comparative paint compositions to resist wine staining has also been assessed. Qualitative results are reported relative to the ability of wine to stain Comparative 1. The inventive paint compositions were less susceptible to wine staining than the control standard.

Open time performance was evaluated by a real world brushout open-time test. According to this test, three separate individuals (Individuals 1, 2 and 3) were asked to paint one panel and the surroundings on a 6-panel factory primed wood door obtained from Home Depot™ with a sample of paint, either an inventive paint composition or a comparative paint composition. These three individuals were provided with an acrylic control paint and the paints undergoing testing in a blinded fashion. The doors were painted in an environment having a temperature of 70.5° F. and a relative humidity of 26%. Each individual was asked to comment on the brushability, especially the ability to cut-in, of each of the paint samples they used. The open time was evaluated on a 5-point scale as follows: 1 (very poor, quick set up), 2 (so-so, poor), 3 (average, ok, good), 4 (very good), and 5 (excellent, open, wet). As evident from Table II, the open time for the inventive paint compositions was substantially longer than the open time for the comparative acrylic paints.

Application performance was evaluated by a real world brush-out application test. According to this test, three separate individuals (Individuals 1, 2 and 3) were asked to paint one panel and the surroundings on a 6-panel factory primed wood door obtained from Home Depot™ with a sample of paint, in the same blinded manner and using an acrylic control paint, as in the real world brushout open-time test, and under the same conditions of temperature and humidity (i.e., temperature of 70.5 OF and a relative humidity of 26%). Each individual was asked to comment on the brushability, and feel, especially the wetting and spreading, of each of the paint samples they used. The application was evaluated on a 5-point scale as follows: 1 (very poor, spreading issues, dry, etc.), 2 (so-so, poor), 3 (average, ok, good), 4 (very good), and 5 (excellent, wet, creamy, easy to apply, high quality feel). Table II paint data shows that the application characteristics of the comparative and inventive paint samples were about the same.

Flow and leveling performance has also been evaluated by a brush mark test. According to this test, the extent of brush marks present in the final film were assessed visually for each of the test paints. After being brushed out and dried, the paints were given a numerical rating based upon their appearance according to a 5-point scale where 1=poor flow and 5=excellent flow. Thus, the more brush marks present in the final film the lower the score. Table II shows that the flow and leveling characteristics, based on the above brush mark test, of the inventive paint samples were substantially better than the flow and leveling characteristics of the comparative acrylic paints.

Real world rankings for inventive and comparative paint compositions were obtained from those individuals (Individuals 1, 2 and 3) who performed the real world brushout tests with respect to open time and application. Each individual performing the real world brushout tests was asked, after allowing the doors to dry a day, to assess the dry appearance of the door panels they had painted as well as the door panels painted by the other two individuals. The dry appearance of the paint was rated by each individual on a 4-point scale, wherein 1 is best (best, smooth, absence of brush marks, and exhibits uniformity of paint) and 4 is worst (worst, rough, clear brush marks, and exhibits unevenness of paint). Table II shows that individuals preferred the dry appearance and finish of the inventive paint compositions over the comparative acrylic paint composition based on the rankings.

To summarize the results, the comparative acrylic paint compositions and the inventive paint compositions were substantially similar with respect to KU viscosity, ICI viscosity, pH, gloss, sheen, wet adhesion characteristics, and low temperature coalescence characteristics. With respect to Comparative 1 and the inventive compositions, block resistance, scrub resistance, stain removal characteristics (both litter and TTP-29 stain), and water spotting was about the same, although the inventive compositions exhibited better wine stain resistance than the standard acrylic paint Comparative 1. However, compared to the comparative acrylic paint compositions, the inventive paint compositions exhibited substantially improved open time by real world brushout, and substantially improved flow and leveling characteristics based on Leneta flow and leveling testing and based on the brush mark test. In addition, individuals ranked the inventive paints consistently higher with respect to dry appearance and finish than the comparative acrylic paints. These substantially improved results with respect to open time, flow and leveling characteristics, appearance and finish compared to acrylic paint composition is unexpected. The comparative acrylic paints exhibited substantially less water sensitivity than the inventive paints.

Additional Real World Brushout Testing

Additional real world brushout testing was performed by a single individual, who tested seven paint samples (six inventive paint samples and one control acrylic paint sample) using the real world brushout testing protocol described above, including the brush mark test and then provided real world rankings for the best four paint compositions. The testing was performed blindly by the same individual under the temperature condition of 69.8° F. and 30% relative humidity. Results of the real world brushout testing are summarized in the Table III below in the order in which testing was performed.

TABLE III

Results of Real World Brushout Testing of Additional Inventive Paint Samples

| Blind Trial | Paint Particle Description | Time Line (in minutes) | Open Time (minutes) | Ranking |
|---|---|---|---|---|
| A | 30/70 acrylic core-vinyl acrylic shell, 4% DAAM, MAA, 20% 2-EHA | 0:00 good application, good in can feel<br>2:54 flow doesn't look bad<br>5:00 wet<br>6:00 starting to dry<br>7:00 dry | 7 min | |
| B | 30/70 acrylic core-vinyl acrylic shell, 4% DAAM, MAA, 20% 2-EHA | 0:00 slightly worse spreading and wetting than Trial A<br>3:42 application good<br>5:00 wet<br>6:00 more wet than Trial A<br>7:00 wet<br>8:00 slightly dry | ~8 min | $1^{st}$ (best open time, application, and best flow and leveling) |
| C | 30/70 acrylic core-vinyl acrylic shell, 4% DAAM, MAA, 20% 2-EHA | 0:00 applies similarly to Trial B<br>5:00 wet<br>6:00 starting to dry similar to Trial A<br>7:00 dry (seems that Trial B has better open time than Trial C) | 7 min | $4^{th}$ |
| D | 100% acrylic Control | 0:00 brushing very nicely, no drag<br>3:16 starting to dry $2^{nd}$ time, Trial B is still best<br>5:00 so-so<br>6:00 dry-don't like appearance | 6 min | |
| E | 30/70 acrylic core-vinyl acrylic shell, 4% DAAM, MAA, 20% BA | 0:00<br>2:19 applied nicely, creamy<br>3:24 no drag, flow looks good<br>5:00 wet<br>6:00 wet<br>7:00 starting to set, not open like before, similar to Trial B in open time<br>8:00 dry | 8 min | $2^{nd}$ |
| F | 30/70 acrylic core-vinyl acrylic shell, 4% DAAM, MAA, 20% BA | 0:00<br>2:26 slight drag compared to other paints, wetting is poor<br>3:31 more drag, don't like this one, seems "dry" all over<br>5:00 open, seems to have the worst feel/look<br>6:00 starting to dry<br>7:00 dry, not like Trial D | 7 min | |
| G | 30/70 acrylic core-vinyl acrylic shell, 4% DAAM, MAA, 20% BA | 0:00<br>2:24 applied well, no problem at all<br>3:18 no drag, paint looks open<br>5:00 open<br>6:00 starting to dry<br>7:00 dry | 7 min | $3^{rd}$ |

The above real world brushout testing reported in Table III compared three batches of the same inventive paint formula including 4% DAAM, MAA, and 20% 2-EHA against three batches of a second inventive paint formula including 4% DAAM, MAA, and 20% BA. This real world brushout testing employed 100% acrylic Aura paint as a control. This testing shows how the open time, application and flow and leveling evaluations may be carried out at the same time.

Table III of real world brushout testing data demonstrates that the inventive paints' open times range between 7 minutes and 8 minutes, and are substantially longer than the open time of the control paint.

Paints with vinyl acrylic core and acrylic shell latex similar to Examples 1-3 and 42-43 above were also made and tested. The test results were compared to Comparative Example 1, discussed above.

TABLE IV

| Data for Paints Made with Vinyl-Acrylic Core and Acrylic Shell Latex | | | | |
|---|---|---|---|---|
| Description | Comparative 1 | Inventive 3 | Inventive 4 | Inventive 5 |
| | 100% Acrylic Production Formula with open time extender[A] | 70/30 Vinyl acrylic core-acrylic shell 20% 2-EHA, MAA, SVS, 2% DAAM (core), 4% DAAM (shell) | 70/30 Vinyl acrylic core-acrylic shell 20% 2-EHA, MAA, SVS, 6% DAAM (shell only) | 70/30 Vinyl acrylic core-acrylic shell 20% 2-EHA, MAA, SVS, 6% DAAM (shell only) |
| viscosity (KU)[B] | 100.8 | 99.6 | 97.6 | 94.11 |
| viscosityP[C] | 1.17 | 1.154 | 1.179 | 1.612 |
| pH | 8.6 | 8.37 | 8.43 | 7.84 |
| Sag | 12 | 12 | 12 | 12 |
| Flow & Leveling [D] | 6 | 8 | 9.5 | 8 |
| Air Dry Gloss .003 DD | 51.8 | 51.9 | 46.8 | 53.2 |
| Air D Sheen .003 DD | 83.4 | 82.3 | 81.2 | 86.6 |
| ASTM Wet Adhesion 7 day 3 min | 4.5 | 5 | 3.5 | 3 |
| ASTM Wet Adhesion 7 day 5 min | 5 | 5 | 4 | 3 |
| Wet Adhesion 7 day (Scratch Test) | 3 | 3 | 3 | 3 |
| Block Resistance 1 Day 120° F. | 3 (moderate tack) | 2 | 3 | 2 |
| Low Temp Coalescence 50° F. | 1 (pass) | 1 | 1 | 1 |
| ASTM Scrub Resistance 7 Day Dry | 1389 | 650 | 200 | 150 |
| ASTM Scrub Resistance 7 Day Dry (First Break) | 1194 | 600 | 220 | 200 |
| Stain Removal Flat (Litter Stain) Cycles | 10 | 10 | 5 | 5 |
| Stain Removal Non-Flat (TTP-29 stain) Cycles | 10 | 10 | 5 | 5 |
| Water Sensitivity (Thumb Scratch) 1 mm | 4 | 3.5 | 2 | 2 |
| Water Sensitivity (Thumb Scratch) 2 min | 4 | 3 | 2 | 2 |
| Water Sensitivity (Thumb Scratch) 3 min | 4 | 2 | 2 | 2 |
| Water Stain (Water Spotting) 7-day dry | 2 (poor) | 1 (very poor) | 1 | 1 |

TABLE IV-continued

Data for Paints Made with Vinyl-Acrylic Core and Acrylic Shell Latex

| Description | Comparative 1 | Inventive 3 | Inventive 4 | Inventive 5 |
|---|---|---|---|---|
| Wine Stain | 3 (good) | 2 (poor) | 2 (poor) | 1 (very poor) |
| Real World Brushout (Open Time) | 1 (very poor) | 5 (excellent) | — | — |
| Real World Brushout (application) | 5 (excellent) | 5 (excellent) | — | — |
| Brush Mark Test (Flow and Leveling) | 2 (poor) | 3 (good) | — | — |
| Real World Ranking (Final Dry Appearance/Finish) | 3 (average) | 5 (excellent) | — | — |

The open time, application and dry finish properties of Inventive Example 3 are better than those of Comparative Example 1. Without being bound to any particular theory, the present inventors believe that the latex particles even with the vinyl acrylic in the core have similar positive effects as those with the vinyl acrylic in the shell. Additionally, the core-shell latex may be side-by-side latex, as discussed above.

As used herein, minimum film forming temperature (MFFT) is the minimum temperature at which the latex will form a continuous film. MFFT was determined on MFFT Bar-90 from Rhopoint Instruments. Temperature range was between 0° C. (the cold end) and 18° C. (the warm end). Emulsions were applied using 75 micron cube applicator from the warm end on the right to the cold end on the left to form tracks. Emulsions were allowed to dry for 3 hours. When films have formed, the MFFT were determined as points on tracks where the film has coalesced.

Examples of biocides/preservatives useful in the compositions according to the invention can include, but are not limited to, hydroxy-functional aza-dioxabicyclo compounds such as those commercially available from ISP (mixture of bicyclic oxazolidines), those compounds pertaining to octyl-isothiazolinone (OIT)-based preservative, isothiazolones such as 4,5-dichloro-2-N-octyl-3(2H)-isothiazolone, broad spectrum non-metallic fungicide additives from Troy Corp. and the like, and combinations thereof.

In another aspect of the invention, the latex compositions can be included in a paint or other coating composition, which can advantageously be an emulsion further containing water, a coalescence solvent, a pH adjustor, a surfactant, a defoamer, a pigment, optionally but preferably a dispersant, optionally but preferably a rheology modifier, and optionally but preferably a biocide or preservative.

Examples of coalescence solvents and organic solvents useful in the compositions according to the invention can include, but are not limited to, 2-ethylhexyl ether of ethylene glycol, methyl carbitol, propylene glycol, ethylene glycol, compounds such as CAS No. 25265-77-4 (2,2,4-Trimethyl-1,3-pentanediol monoisobutyrate), plasticizers such as dibutyl phthalate, and the like, and combinations thereof.

Examples of defoamers useful in the compositions according to the invention can include, but are not limited to, polysiloxane-polyether copolymers such as dimethylpolysiloxanes combined with hydrophobic and partially hydrophilic polyethers, and VOC-free, silicone-free polymer-based defoamer, and nonionic antifoam formulations, such as may comprise a blend of mineral oils and silica derivatives, and organic oil-based defoamers, mineral oil-based defoamers, siloxane-based defoamers, and molecular defoamers, and the like, and combinations thereof.

Examples of anticorrosive agents useful in the compositions according to the invention can include, but are not limited to, sodium nitrite, ammonium benzoate, sodium benzoate and the like.

Examples of dispersants useful in the compositions according to the invention can include, but are not limited to, 2-amino-2-methyl-1-propanol, hydrophobic copolymers such as ammonium salt of a hydrophobic copolymer dispersant, carboxylated polyelectrolyte salts such as sodium salt of a maleic anhydride copolymer dispersant, and the like, and combinations thereof.

Examples of rheology modifiers useful in the compositions according to the invention can include, but are not limited to, hydrophobically modified urethane rheology modifiers, hydrophobically modified polyether rheology modifiers, alkali swellable (or soluble) emulsions, hydrophobically modified alkali swellable (or soluble) emulsions, cellulosic or hydrophobically modified cellulosic rheology modifiers. Examples are those available from Rohm & Haas and classified as Hydrophobically Modified Ethylene Oxide Urethane (HEUR) Rheology Modifier, for example, hydrophobically modified polyethylene oxide urethane, and hydroxyethylcellulose (HEC), which is a nonionic, water-soluble polymer, and hydrophobically modified hydroxyethylcellulose (HMHEC)) and nonionic, hydrophobically modified polyethers from Aqualon Division of Hercules Inc, and hydrophobically modified alkali-soluble emulsions from Dow.

While typically multiple pigments/colorants are present in end-use latexes that are to be used in paint or architectural coating applications, sometimes only a white pigment, such as a zinc oxide and/or a titanium oxide, is added in the early stages of the formation of the paint composition (e.g., in the base composition). In such a case, any other desired pigments/colorants of various colors (including more white pigment) can optionally be added at the later stages of, or after, formation of the paint composition. Examples of pigments/colorants useful according to the invention can include, but are not limited to, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, DAN orange, quinacridone magenta, quinacridone violet, and the like, and any combination thereof. These exemplary color pigments can be added as powders, but can more conveniently be added as aqueous dispersions to paint compositions according to the invention.

Additionally or alternately, extender pigments/colorants can be added, e.g., to the grind composition portion of the paint composition. Examples of extender pigments/colorants useful in the paint compositions according to the invention can include, but are not limited to, silica, silicates, carbonates such as calcium carbonates, and the like, and combinations thereof.

The latex compositions according to the invention can advantageously exhibit a pH from about 6 to about 10, although the pH needs only to be sufficient to maintain the stability of the particular constituents in combination with the surfactant(s) and other stabilizing components.

The polymer particles according to the invention are typically polymerized in a latex system comprising water, surfactant, the desired monomer(s), an initiator, optionally a polymer molecular weight control agent, optionally an organic solvent, optionally a pH adjustor, and optionally a chaser agent, which can be added at various times. Molecular weights reported in this disclosure are number average molecular weights unless otherwise specified, and have units in Daltons.

Examples of surfactants useful in the compositions according to the invention can include, but are not limited to, nonionic and/or anionic surfactants such as sodium lauryl sulfate, alkyl-phenol (APE)-free nonionic surfactant from Rhodia which is a fatty alcohol ether (40 EO), ammonium nonoxynol-4 sulfate, nonylphenol (10) ethoxylate, nonylphenol (~10 mol %) ethoxylate, nonylphenol (~40 mol %) ethoxylate, octylphenol (~40 mol %) ethoxylate, octylphenol (9-10) ethoxylate, sodium dodecyl sulfonate, sodium tetradecyl sulfonate, sodium hexadecyl sulfonate, polyether phosphate esters, alcohol ethoxylate phosphate esters, nonionic and anionic surfactants from Dow Chemical, anionic alkyl sulfate surfactants from Rhodia, anionic alkyl ether sulfate surfactants from Rhodia, anionic sulfonate surfactants from Rhodia, anionic phosphate ester surfactants from Rhodia, and the like, and combinations thereof.

Examples of initiators and chaser solutions useful in the compositions according to the invention can include, but are not limited to, ammonium persulfate, sodium persulfate, redox systems such as reducers comprising sodium salt of an organic sulfinic acid derivative, and sodium hydroxymethanesulfinate (i.e., sodium formaldehyde sulfoxylate), and oxidizer such as tert-butyl hydroperoxide, and the like, and combinations thereof, typically in an aqueous solution. Either or both of these components can optionally contain an additional surfactant and/or a pH adjustor, if desired to stabilize the emulsion.

Examples of pH adjustors useful in the compositions according to the invention can include, but are not limited to, ammonium hydroxide, sodium hydroxide, sodium carbonate, sodium bicarbonate, potassium hydroxide, potassium carbonate, potassium bicarbonate, ammonia, and the like, and combinations thereof. In certain cases, compounds that qualify as pH adjustors can be added for purposes other than adjusting pH, e.g., emulsion stabilization, and yet are still characterized herein as pH adjustors.

While various embodiments of the present invention have been described above, it should be understood that they have been presented by way of illustration and example only and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein and each reference cited herein, can be used in combination with the features of any other embodiment.

What is claimed is:

1. An aqueous latex composition comprising latex particles comprising a first phase polymer, and a second phase polymer, wherein
    the first phase polymer is polymerized from a first set of monomers comprising at least about 95 wt. % of one or more acrylic monomers in the first phase polymer; and
    the second phase polymer is polymerized from a second set of monomers comprising at least one acrylic monomer, at least one vinyl monomer and from about 0.5 wt. % to about 6 wt. % of a crosslinkable monomer in the second phase polymer;
    wherein the second phase polymer comprises from about 50 wt. % to about 95 wt. % based on the total weight of the polymers in the latex particles; and
    wherein the crosslinkable monomer is selected from the group consisting of diacetone acrylamide, diacetone methacrylamide and acetoacetoxyethyl methacrylate or a combination thereof, and
    wherein the aqueous latex composition further comprises a cross-linking agent in an aqueous phase to crosslink with the crosslinkable monomer when water evaporates, and
    wherein a total amount of vinyl monomer in the latex particles is greater than about 50 wt. % of the latex particles and a ratio of vinyl monomer to acrylic monomer in the latex particles is less than about 95:5.

2. The aqueous latex composition of claim 1, wherein the first set of monomers further comprises about 1 wt. % to about 5 wt. % of the crosslinkable monomer in the first phase polymer.

3. The aqueous latex composition of claim 2, wherein the crosslinkable monomer comprises diacetone acrylamide.

4. The aqueous latex composition of claim 1, wherein the second set of monomers includes from about 1 wt. % to about 4 wt. % of the crosslinkable monomer in the second phase polymer.

5. The aqueous latex composition of claim 1, wherein the cross-linking agent comprises adipic dihydrazide.

6. The aqueous latex composition of claim 1, wherein the at least one vinyl monomer in the second set of monomers comprises vinyl acetate.

7. The aqueous latex composition of claim 6, wherein the at least one acrylic monomer in the second set of monomers comprises butyl acrylate or 2-hexyl ethyl acetate.

8. The aqueous latex composition of claim 1, wherein the second phase polymer comprises from about 60 wt. % to about 80 wt. % based on the total weight of the latex particles.

9. The latex aqueous composition of claim 1, wherein the ratio of vinyl monomer to acrylic monomer in the latex particles ranges from about 60:40 to about 90:10.

10. The aqueous latex composition of claim 1, wherein the ratio of vinyl monomer to acrylic monomer in the latex particles is less than about 90:10.

11. The aqueous latex composition of claim 1, wherein the ratio of vinyl monomer to acrylic monomer in the latex particles is less than about 80:20.

12. The aqueous latex composition of claim 1 having a minimum film faulting temperature from about 4° C. to about 15° C.

13. The aqueous latex composition of claim 1, wherein the first set of monomers further comprises a crosslinking monomer.

14. The aqueous latex composition of claim 13, wherein the crosslinking monomer comprises 1,4-butanediol diacrylate.

15. A paint composition comprising the aqueous latex composition of claim 1.

16. The aqueous latex composition of claim 1, wherein the latex particles are sequentially polymerized latex particles.

17. The aqueous latex composition of claim 16, wherein a volume average particle size of the sequentially polymerized latex particles ranges from about 120 nm to about 165 nm in diameter.

18. The aqueous latex composition of claim 16, wherein the first phase polymer forms a core and the second phase polymer forms a shell.

19. The aqueous latex composition of claim 16, wherein the first phase polymer forms a shell and the second phase polymer forms a core.

20. The aqueous latex composition of claim 16, wherein the first phase polymer and the second phase polymer form side-by-side latex particles.

21. The aqueous latex composition of claim 8, wherein the second phase polymer comprises from about 65 wt. % to about 75 wt. % based on the total weight of the latex particles.

22. The aqueous latex composition of claim 1, wherein the total amount of vinyl monomer in the latex particles is greater than about 60 wt. % of the latex particles.

23. The aqueous latex composition of claim 1, wherein the total amount of vinyl monomer in the latex particles is greater than about 70 wt. % of the latex particles.

* * * * *

UNITED STATES PATENT AND TRADEMARK OFFICE
CERTIFICATE OF CORRECTION

| | | |
|---|---|---|
| PATENT NO. | : 9,688,800 B2 | Page 1 of 1 |
| APPLICATION NO. | : 14/324826 | |
| DATED | : June 27, 2017 | |
| INVENTOR(S) | : Robert J. Sheerin et al. | |

It is certified that error appears in the above-identified patent and that said Letters Patent is hereby corrected as shown below:

In the Claims

In Claim 12, the word "faulting" should be replaced with "forming".

Signed and Sealed this
Fifth Day of September, 2017

Joseph Matal
*Performing the Functions and Duties of the*
*Under Secretary of Commerce for Intellectual Property and*
*Director of the United States Patent and Trademark Office*